US011047724B2

(12) United States Patent
Koster et al.

(10) Patent No.: US 11,047,724 B2
(45) Date of Patent: Jun. 29, 2021

(54) DOSING TIMER AND DISPENSERS USING THE SAME

(71) Applicant: Silgan Dispensing Systems Corporation, Grandview, MO (US)

(72) Inventors: Stefan Koster, Rotterdam (NL); Eelco H. Deman, Vlijmen (NL); Kelly A. Harrigan, Richmond, VA (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 16/484,108

(22) PCT Filed: Jan. 4, 2018

(86) PCT No.: PCT/US2018/012311
§ 371 (c)(1),
(2) Date: Aug. 6, 2019

(87) PCT Pub. No.: WO2018/147946
PCT Pub. Date: Aug. 16, 2018

(65) Prior Publication Data
US 2020/0025599 A1    Jan. 23, 2020

Related U.S. Application Data

(60) Provisional application No. 62/458,042, filed on Feb. 13, 2017.

(51) Int. Cl.
*G01F 13/00* (2006.01)
*B65D 47/08* (2006.01)
*B65D 51/28* (2006.01)

(52) U.S. Cl.
CPC ....... *G01F 13/006* (2013.01); *B65D 47/0885* (2013.01); *B65D 51/2807* (2013.01)

(58) Field of Classification Search
CPC .............. G01F 13/006; B65D 47/0885; B65D 51/2807
USPC .......................................................... 222/40
See application file for complete search history.

(56) References Cited

U.S. PATENT DOCUMENTS

| 68,532 | A | * | 9/1867 | Name | B65D 47/40 |
| | | | | | 222/109 |
| 745,744 | A | * | 12/1903 | Name | G01F 23/02 |
| | | | | | 73/325 |
| 1,621,252 | A | * | 3/1927 | Hillyard | A47G 19/12 |
| | | | | | 222/463 |
| 2,099,629 | A | * | 11/1937 | Schaetzel | B65D 39/06 |
| | | | | | 222/500 |
| 2,714,977 | A | * | 8/1955 | Davis | B65D 47/06 |
| | | | | | 222/424.5 |
| 3,049,922 | A | * | 8/1962 | Schwaneke | A47J 31/4457 |
| | | | | | 73/323 |

(Continued)

FOREIGN PATENT DOCUMENTS

CN            202126593 U      1/2012

*Primary Examiner* — Michael J. Melaragno
(74) *Attorney, Agent, or Firm* — Barlow, Josephs & Holmes, Ltd.

(57) ABSTRACT

A dispensing system includes a pour cap for a container and a timing device configured to visually indicate when a dose has been dispensed from the dispensing system, the timing device being securable to either the pour cap or the container and configurable based on a product being dispensed.

19 Claims, 26 Drawing Sheets

(56) References Cited

U.S. PATENT DOCUMENTS

| | | | | |
|---|---|---|---|---|
| 3,598,284 | A * | 8/1971 | Wessely | B67D 3/00 222/18 |
| 3,647,115 | A * | 3/1972 | McCann | G01F 11/025 222/39 |
| 3,920,149 | A * | 11/1975 | Fortino | B67D 3/0006 222/1 |
| 3,968,688 | A * | 7/1976 | Eaton | G01F 23/02 73/328 |
| 4,054,026 | A * | 10/1977 | Goodrich | G04F 1/08 368/93 |
| 4,115,997 | A * | 9/1978 | Rogovin | G04B 47/00 368/13 |
| 4,353,489 | A * | 10/1982 | Arnold | B65D 47/127 222/570 |
| 4,550,862 | A * | 11/1985 | Barker | B65D 41/26 222/109 |
| 4,666,065 | A * | 5/1987 | Ohren | G01F 11/262 222/109 |
| 4,741,459 | A * | 5/1988 | Silvenis | B65D 41/26 141/381 |
| 4,836,415 | A * | 6/1989 | Grussmark | G04F 1/06 206/216 |
| 5,031,804 | A * | 7/1991 | Conrad | B65D 25/48 222/566 |
| 5,058,772 | A * | 10/1991 | Moore | B65D 47/122 222/109 |
| 5,392,947 | A * | 2/1995 | Gentile | A61K 8/19 215/6 |
| 5,457,665 | A * | 10/1995 | Reid | G04F 1/08 368/93 |
| 5,462,202 | A * | 10/1995 | Haffner | B65D 41/26 222/109 |
| 5,505,349 | A * | 4/1996 | Peckels | B67D 3/0041 222/36 |
| 5,507,411 | A * | 4/1996 | Peckels | B67D 3/0041 222/1 |
| 5,566,862 | A * | 10/1996 | Haffner | B65D 47/06 222/109 |
| 5,855,299 | A * | 1/1999 | Arnold | B65D 47/122 222/109 |
| 5,941,422 | A * | 8/1999 | Struble | B29C 66/8322 222/109 |
| 6,036,055 | A * | 3/2000 | Mogadam | B67D 3/0006 222/23 |
| 6,301,961 | B1 * | 10/2001 | Rolfes | A47J 41/0094 220/592.2 |
| 6,409,046 | B1 * | 6/2002 | Peckels | B67D 3/0041 222/1 |
| 6,505,752 | B1 * | 1/2003 | Rolfes | A47J 41/0016 215/13.1 |
| 6,926,179 | B2 * | 8/2005 | Wagner, III | B65D 47/0842 222/481.5 |
| 7,163,125 | B2 * | 1/2007 | Murakami | B67D 1/0425 215/230 |
| 7,306,121 | B2 * | 12/2007 | Ophardt | B65D 47/065 222/209 |
| 7,845,524 | B2 * | 12/2010 | Evans | G01F 11/262 222/1 |
| 8,511,492 | B2 * | 8/2013 | Webster | B65D 47/06 215/216 |
| 9,428,374 | B2 * | 8/2016 | Houck | B67D 3/0041 |
| 9,717,373 | B2 * | 8/2017 | Andrews | A47K 5/18 |
| 9,718,665 | B2 * | 8/2017 | Wittrup | B67D 3/0041 |
| 10,327,599 | B2 * | 6/2019 | Smith | G01F 13/006 |
| 10,336,514 | B1 * | 7/2019 | Briggs | B65D 47/32 |
| 10,351,319 | B1 * | 7/2019 | Mizer | G01F 11/006 |
| 2005/0103803 | A1 * | 5/2005 | Hung | B65D 47/06 222/109 |
| 2006/0091152 | A1 * | 5/2006 | Evans | G01F 11/26 222/1 |
| 2006/0091153 | A1 * | 5/2006 | Evans | G01F 11/26 222/1 |
| 2006/0131330 | A1 * | 6/2006 | Stebick | B65D 47/122 222/109 |
| 2007/0029352 | A1 * | 2/2007 | Norris | B65D 47/2031 222/494 |
| 2007/0194047 | A1 * | 8/2007 | Tauber | B65D 47/122 222/109 |
| 2009/0045224 | A1 * | 2/2009 | Faaborg | B65D 41/0471 222/111 |
| 2010/0116776 | A1 * | 5/2010 | Szekely | B65D 47/125 215/329 |
| 2010/0213211 | A1 * | 8/2010 | Whaling | B65D 41/56 222/111 |
| 2011/0297698 | A1 * | 12/2011 | Chiang | B65D 47/06 222/109 |
| 2012/0043295 | A1 * | 2/2012 | Webster | B65D 47/06 215/44 |
| 2013/0008919 | A1 * | 1/2013 | Honan | B65D 25/42 222/23 |
| 2013/0334246 | A1 * | 12/2013 | Houck | B67D 3/0041 222/23 |
| 2014/0252034 | A1 * | 9/2014 | Brannon | B65D 47/40 222/111 |
| 2014/0346198 | A1 * | 11/2014 | Bond | G01F 11/265 222/641 |
| 2015/0298875 | A1 * | 10/2015 | Dagnelie | B65D 47/12 222/465.1 |
| 2017/0073115 | A1 * | 3/2017 | Crawford | B65D 47/06 |
| 2018/0310778 | A1 * | 11/2018 | Smith | G01F 11/006 |
| 2019/0071299 | A1 * | 3/2019 | Briggs | G04F 1/08 |
| 2020/0025599 | A1 * | 1/2020 | Koster | B65D 51/2807 |

\* cited by examiner

DOSING TIMER AND DISPENSERS USING THE SAME

BACKGROUND OF THE INVENTION

Field of the Invention

The present invention relates to dispensing systems and more particularly to dispenser devices having a timer feature allowing a user to estimate the dispense rate or dosing volume of the dispenser device.

State of the Art

Dispensing devices are used to dispense a various number of products. Typically, a dispensing device—such as a pump, closure, trigger sprayer, or other device—is attached to a container or bottle containing a product to be dispensed. The dispensing device facilitates the dispensing of the product from the container or bottle.

In many instances, a user desires to measure the amount of product being dispensed from a container through the dispensing device. For example, in many laundry care applications, a dispensing device may include a cap that acts as a cup, having graduated markings in the cap so that a user may measure out a desired amount of product into the cap before pouring the product into an intended location. While such systems allow estimated measurements, many users complain about the additional mess associated with using the cap in such a manner and prefer a one-handed operation allowing them to pour or dispense a product directly into the desired location.

BRIEF SUMMARY OF THE INVENTION

According to certain embodiments of the invention, a dispensing device may include a pour cap having a timing device integrated therewith or integrated with the bottle or container. A timing device may include a transparent or translucent outer cylinder which may be filled with a fluid or other product that may flow within the timing device to visually represent or correspond to a given amount of product being dispensed from the dispensing device. The timing device may include flow channels which may be modified for a particular use such that the visible flow of the fluid or flowable material in the timing device may be used to measure the output of the dispensing device.

A timing device according to various embodiments of the invention may be integrated with a cap, assembled to the cap or integrated with the bottle or assembled to the bottle or handle. The timing device may be positioned near the handle so that a user may visually monitor the timing device during operation. Fluid flowing into, or out of, the timing device may indicate when a dose has been dispensed from the dispensing device.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

An exemplary dispensing system 100 according to various embodiments of the invention is illustrated in FIGS. 1-5. A dispensing system 100 may include a container 900 and a pour cap 110. The pour cap 110 or container 900 may include a timing device 200 incorporated therein wherein the timing device is at least partially visible during use of the dispensing system 100.

Figure 1:
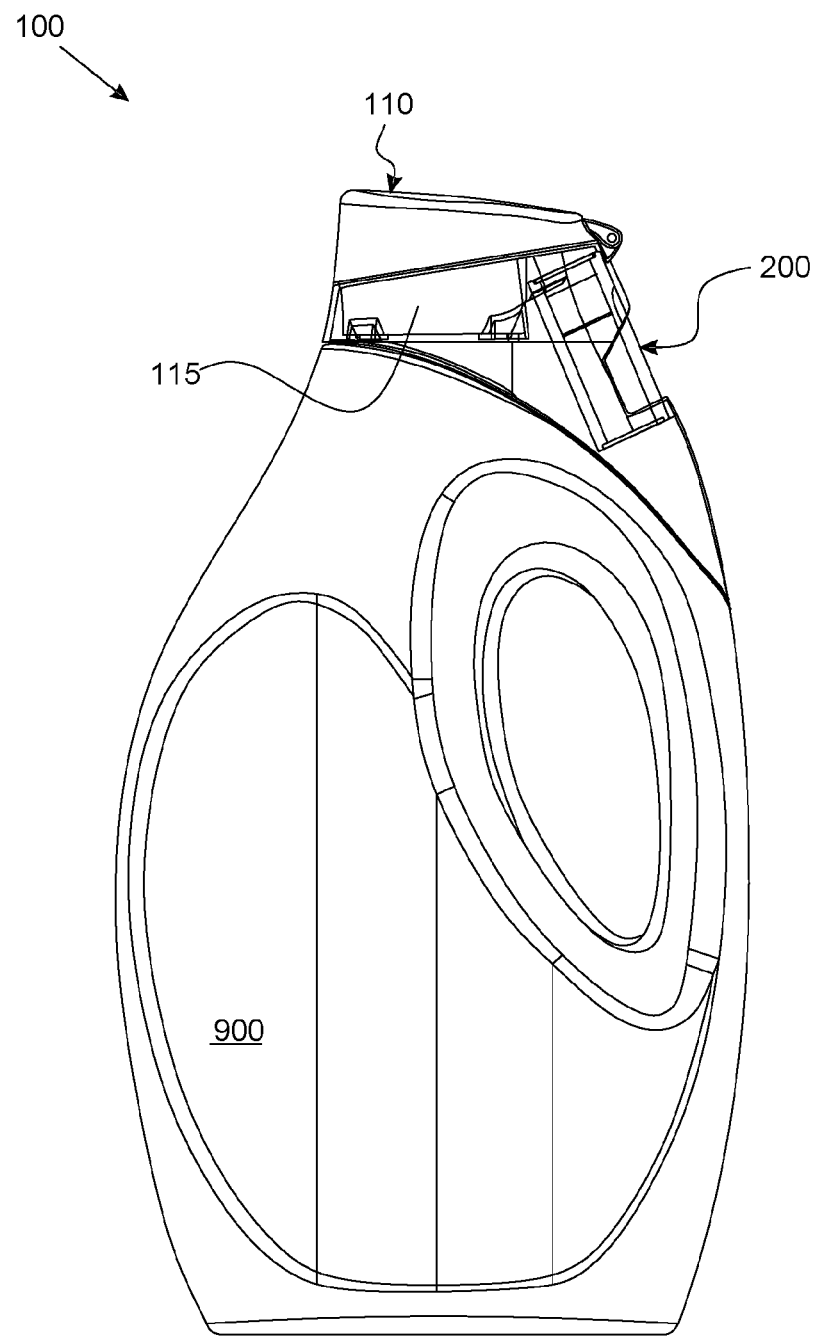
FIG. 1 illustrates a dispensing system according to various embodiments of the invention.
Figure 2:
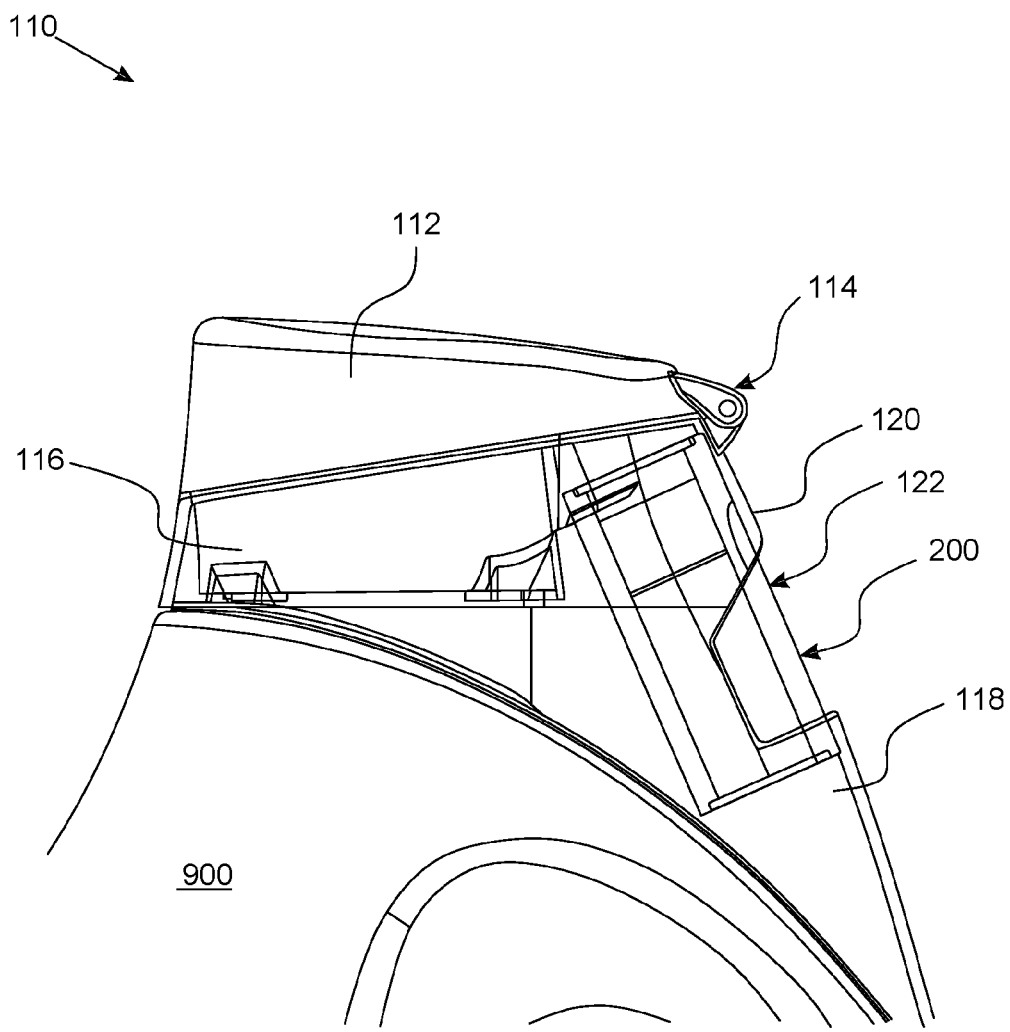
FIG. 2 illustrates a dispenser according to various embodiments of the invention.

According to various embodiments of the invention, a pour cap 110 may include a cap base 116 and a closure 112 as illustrated in FIG. 2. The cap base 116 may be connected to or mated with a container 900. For instance, the cap base 116 may include an inner skirt 115 including threads, bayonet features, snap features, or other features allowing the pour cap 110 to be connected to an opening in a container 900 having similar features. The closure 112 may be connected to the cap base 116 by a hinge 114 or hinge system. For example, as illustrated in FIG. 2, a hinge 114 may include a top portion integral with the closure 112 and a bottom portion integral with the cap base 116. A pivot rod or other pivot feature may connect the top portion and bottom portion of the hinge 114 such that closure 112 may be moved or rotated from a closed position where it is engaged with the cap base 116 to an open position. In other embodiments, a hinge system 114 may include a living hinge formed between the closure 112 and cap base 116 (see also FIGS. 6-9 and 19-23).

According to various embodiments of the invention, an outer skirt or decorative shroud of the pour cap 110 may include a window 122 through which a portion of a timing device 200 may be viewed. The timing device 200 may be seated in a portion of the pour cap 110 (FIGS. 1-9) or in a portion of the container 900 (FIGS. 29-34) or may be secured to the pour cap (FIGS. 19-23) or secured to the bottle 900 (FIGS. 35-36).

Figure 3:
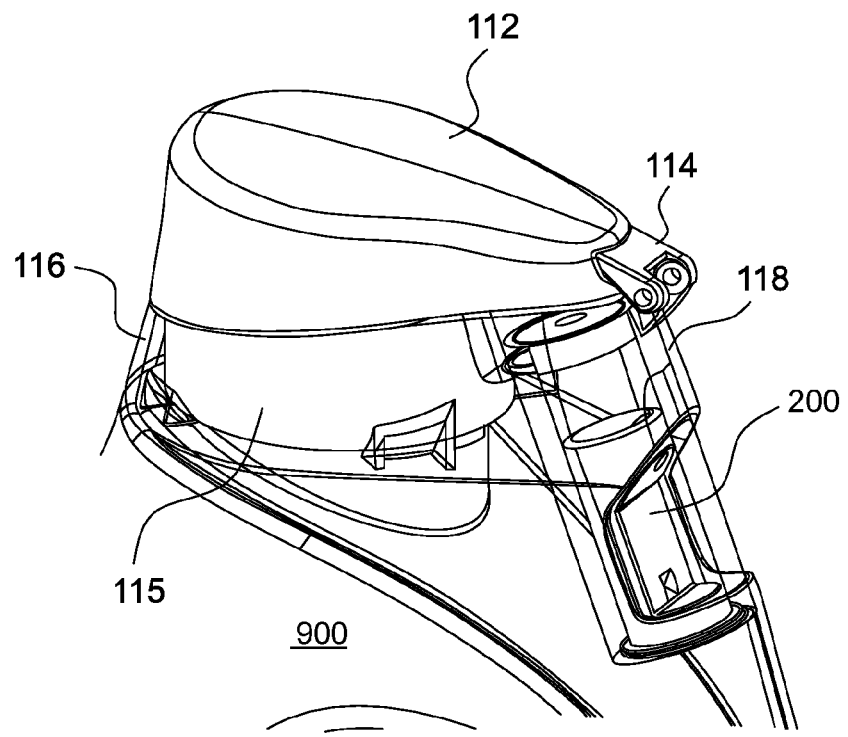
FIG. 3 illustrates a perspective view of a dispenser according to various embodiments of the invention.

As illustrated in FIG. 2, a timing device 200 may be seated a rear portion of the cape base 116 and adjacent the hinge 114. In some embodiments of the invention, the cap base 116 may include a timing device slot 120 into which a timing device 200 may be seated as illustrated in FIG. 2. The window 122 may be advantageously located on the pour cap 100 so that the timing device 200 is easily visible to a user during operation or use of the dispensing system 100. As illustrated in FIG. 3, a timing device 200 may be visible through window 122 adjacent a rear portion of the pour cap 110.

While certain aesthetic shapes and designs of a pour cap 110 are illustrated in FIGS. 1 through 9, it is understood that other shapes, configurations, and aesthetic designs may be incorporated with various embodiments of the invention.

Figure 4:
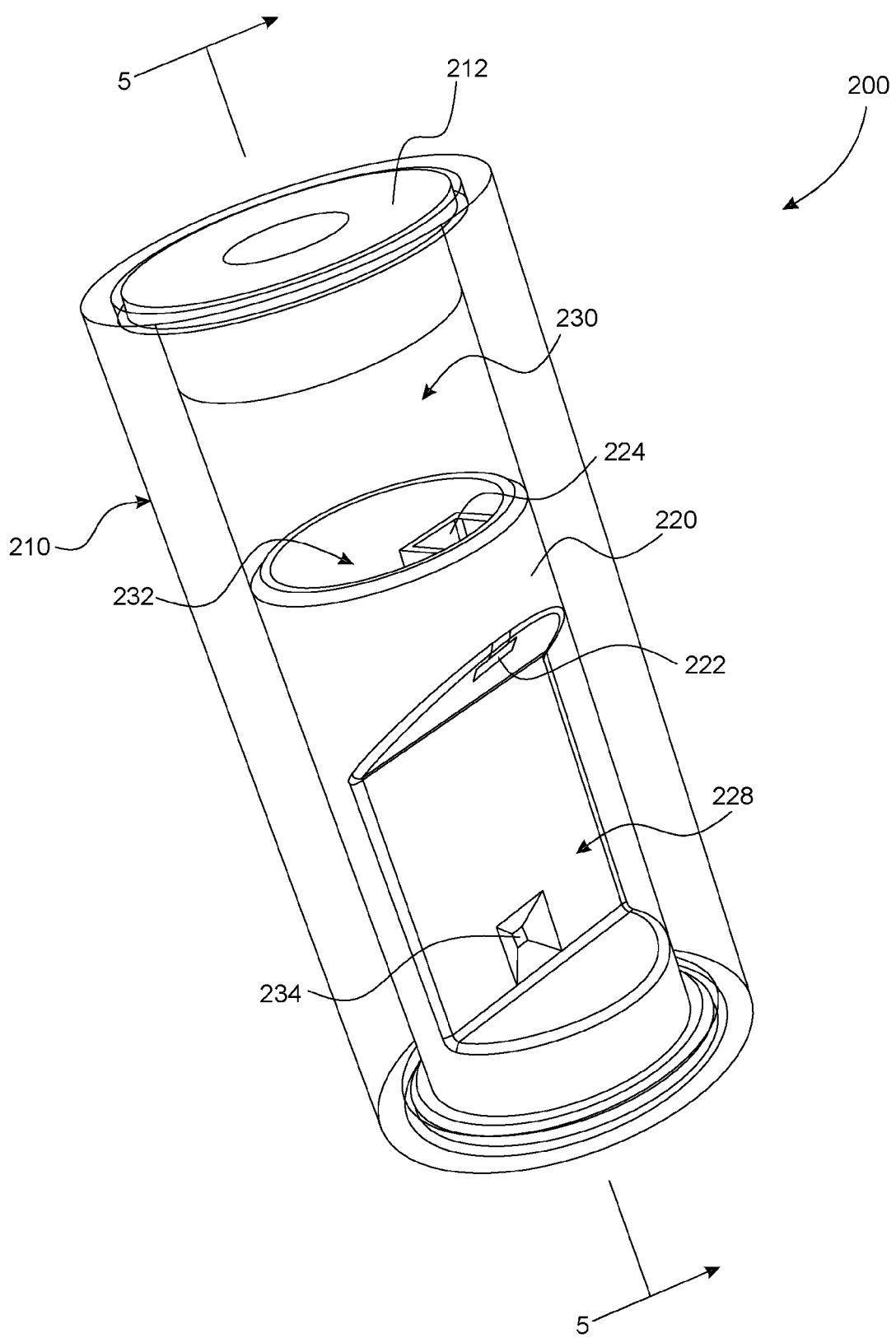
FIG. 4 illustrates a perspective view of a timing device according to various embodiments of the invention.
Figure 5:
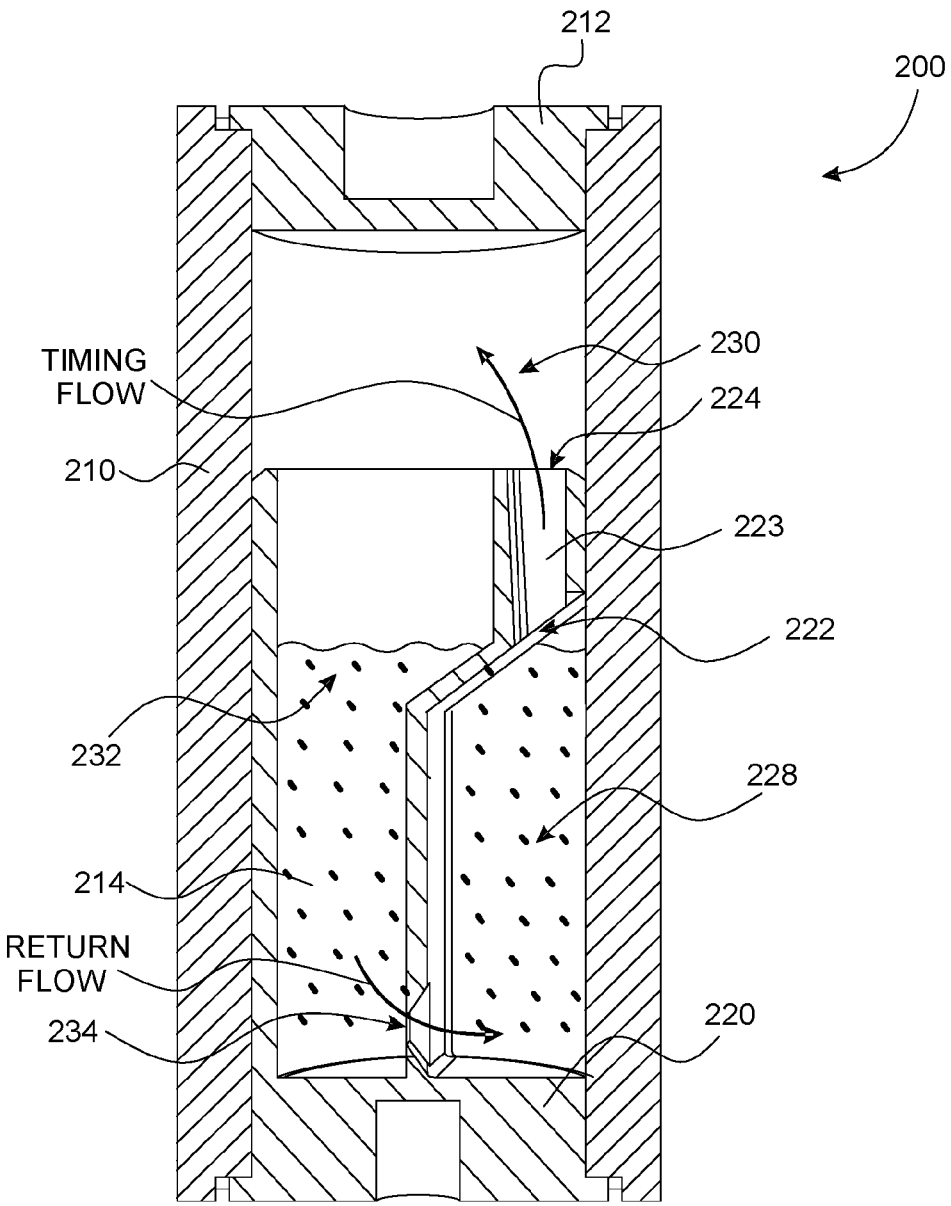
FIG. 5 illustrates a cross-sectional view thereof taken along line 5-5 of FIG. 4.
Figure 6:
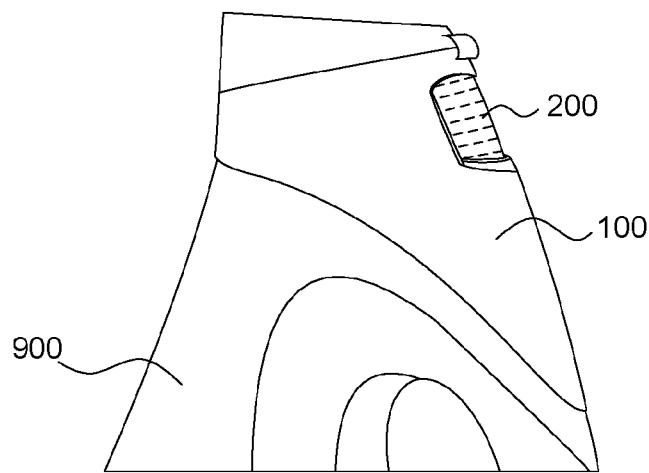
FIGS. 6-9 illustrate an exemplary timing sequence of fluid flowing out of the timing device during a dispensing operation.
Figure 7:
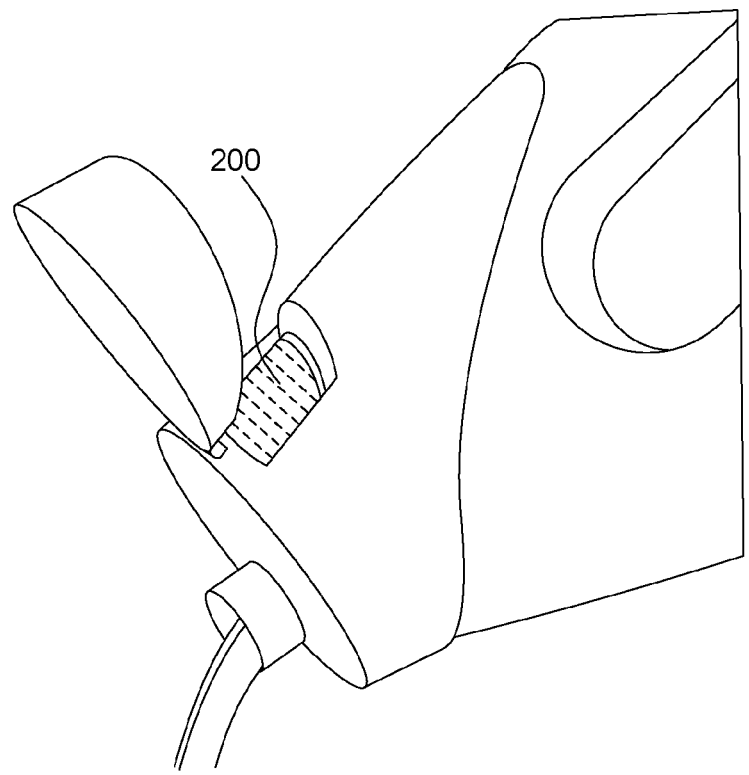
Figure 8:
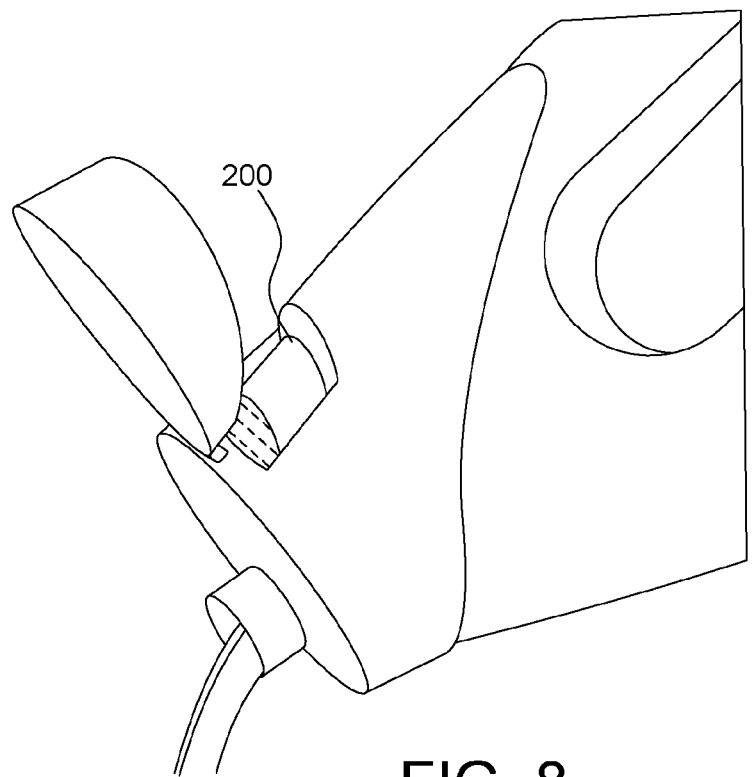
Figure 9:
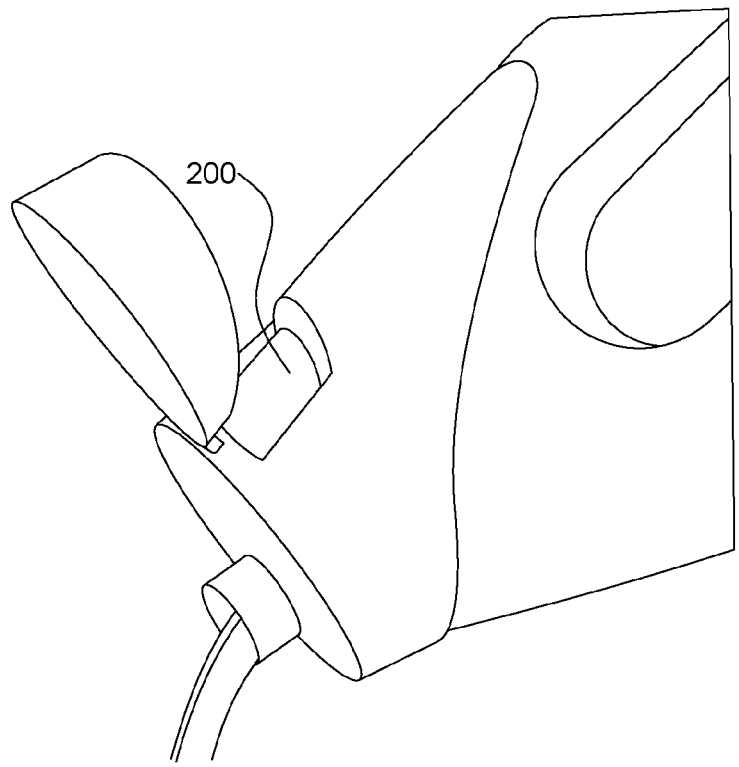

An exemplary timing device 200 according to various embodiments of the invention is illustrated in FIGS. 4 and 5. As illustrated in FIG. 4, a timing device 200 may include a transparent or translucent outer cylinder 210 having two open ends and a hollow space defined by the outer cylinder 210. One end of the outer cylinder 210 may be plugged with an end cap 212 as illustrated. An end cap 212 may be configured to seal an end of the outer cylinder 210 and to prevent fluid from escaping an interior portion of the outer cylinder 210. In some embodiments of the invention, an end cap 212 may include one or more features capable of securing the timing device 200 to a pour cap 110. In other embodiments, an end cap 212 may include a filling port through which a fluid or liquid 214, or other flowable material, may be introduced into an interior space of the outer cylinder 210. For example, an end cap 212 may include a valve through which liquid may pass or a sealable channel through which a filling needle may be inserted to introduce fluid into an interior of the outer cylinder 210.

A flow regulator 220 may be inserted in an open end 221 of the outer cylinder 210 opposite an end cap 212 as illustrated in FIG. 4. The flow regulator 220 may seal or close the end of the outer cylinder 210 into which it is placed. Positioning of a flow regulator 220 within the outer cylinder 210 may define a timing reservoir 228 and a storage reservoir 230 separated by portions of the flow regulator 220. A flow regulator 220 may include flow channel 223 having a channel opening 222 in fluid communication with, and opening into, the timing reservoir 228. A channel exit 224 may be positioned opposite the channel opening 222 and in fluid communication with, and opening into, the storage reservoir 230. Flow channel 223 may be defined between the channel opening 222 and channel exit 224. A fluid return channel 232 defined by the flow regulator 220 may be positioned adjacent to the timing reservoir 228 but separated therefrom by a portion of the flow regulator 220. A fluid return opening 234 may connect the timing reservoir 228 with the fluid return channel 232.

According to various embodiments of the invention, an interior portion of the outer cylinder 210 is partially filled with fluid 214. At rest, as illustrated in FIG. 5, a volume of the fluid 214 may be contained in the timing reservoir 228 and in the fluid return channel 232.

Referring to FIGS. 6-9, an exemplary pouring sequence is illustrated. To use the dispensing system 100, a user may open the closure 112 and tip the dispensing system 100 to dispense product from within the container 900 through the pour cap 110. As product is poured from the pour cap 110, fluid in the timing device 200 begins to exit the timing reservoir 228 through the channel opening 222 to be collected in the storage reservoir 230. Movement of the fluid out of the timing reservoir 228 corresponds to an amount of fluid being poured from the pour cap 110. Thus, once the timing reservoir 228 has been emptied, a user knows that they have completed dispensing one dose of the product in the container 900.

Upon tipping, the dispensing device 100 back into a non-use position, fluid in the storage reservoir 230 of the timing device 200 begins to refill the timing reservoir 228 through the fluid return opening 234.

According to various embodiments of the invention, characteristics of the fluid in the timing device 200 may be altered to change the time that it takes the timing reservoir 228 to empty. Thus, indication of a full dose of dispensing may be altered or selectively chosen by choosing the flow characteristics of the fluid.

In other embodiments of the invention, the area or size of the channel opening 222 may be altered such that the flow of fluid out of the timing reservoir 228 is slower or faster. Thus, if the product to be dispensed with the dispensing system 100 has a low viscosity, the channel opening 222 may be larger than if a product having a higher viscosity is to be dispensed. Thus, the flow rate of fluid through the channel opening 222, and the emptying of the timing reservoir 228, can be adjusted by altering the size of the channel opening 222. The ability to adjust the time it takes for fluid to evacuate the timing reservoir 228 allows timing devices 200 to be customized for use with many different products and dosage sizes. Depending on the amount of product desired in a dose from the dispensing system 100, an appropriate timing device 200 may be selected or constructed to provide a visual timer capable of notifying a user when they have completed dispensing an entire dose of product.

According to various embodiments of the invention, the size of the fluid return opening 234 may be increased or decreased to allow fluid to refill the timing reservoir 228 faster or slower than it escapes the timing reservoir 228. In some instances where a user may desire to rapidly dose, reset, and re-dose, a larger fluid return opening 234 may allow the resetting of the timing device 200 in a quicker amount of time for the next use.

Figure 10:
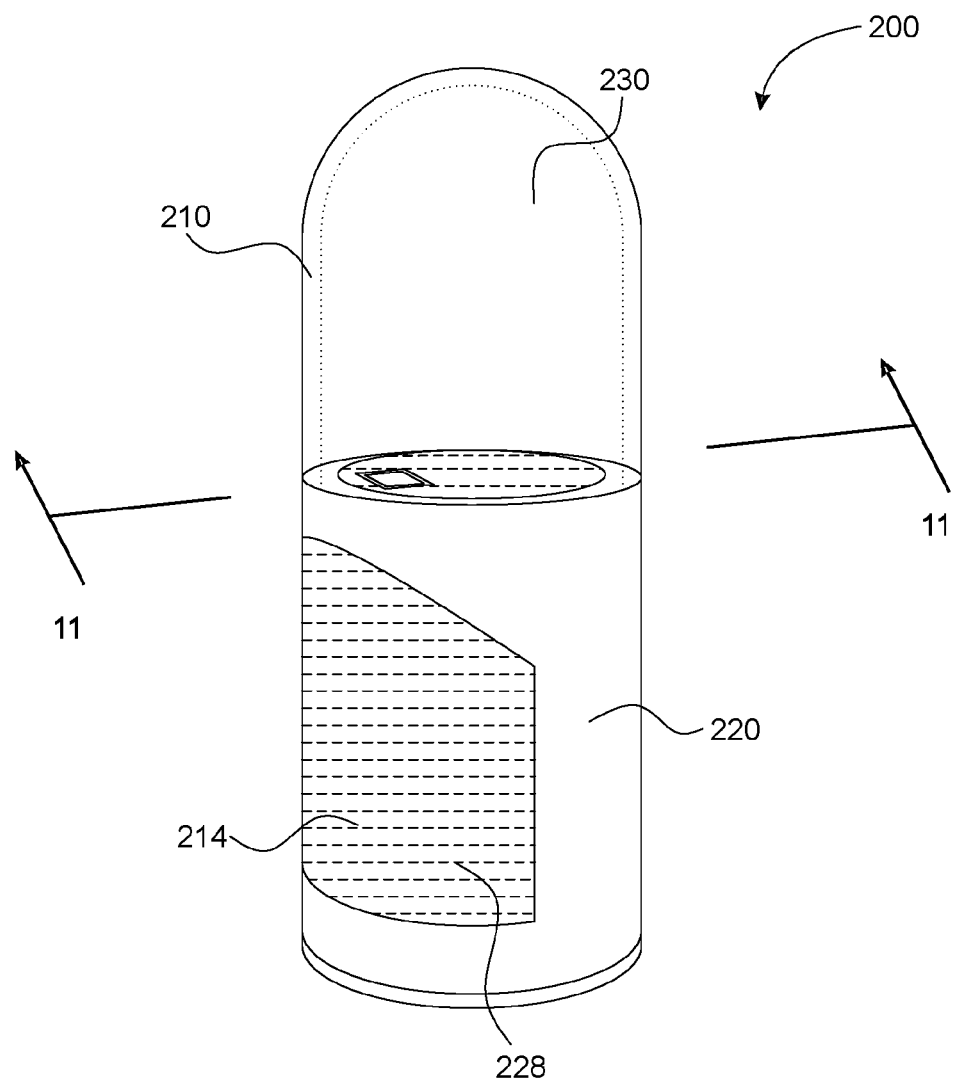
FIG. 10 illustrates a perspective view of another exemplary timing device according to various embodiments of the invention.
Figure 11:
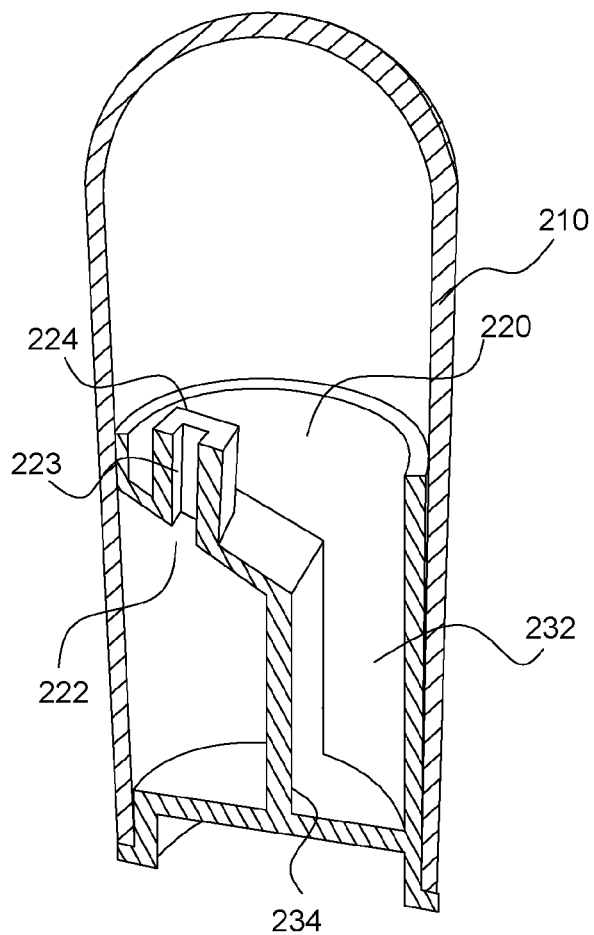
FIG. 11 illustrates a cross-sectional view thereof taken along line 11-11 of FIG. 10.
Figure 12:
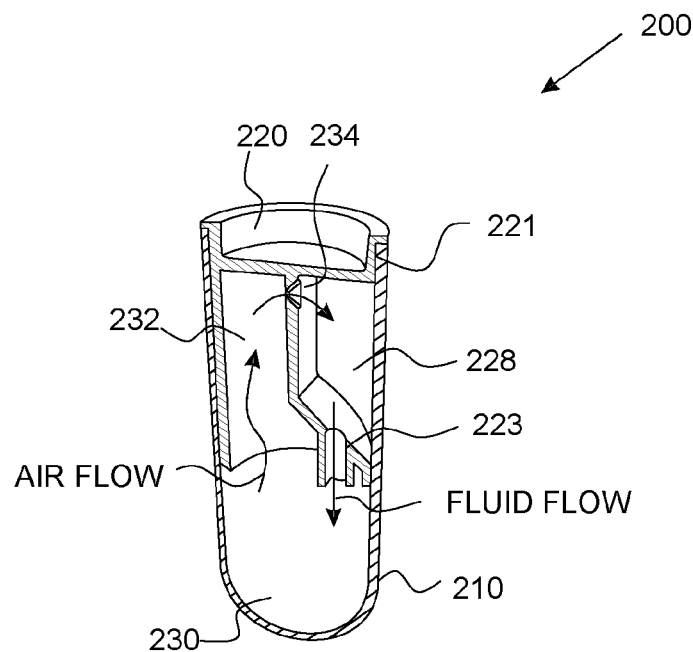
FIG. 12-13 illustrate cross-sectional views thereof showing the flow path of fluid and air during a timing stage and a reset stage when the timing device is used in a timing chamber emptying configuration.
Figure 13:
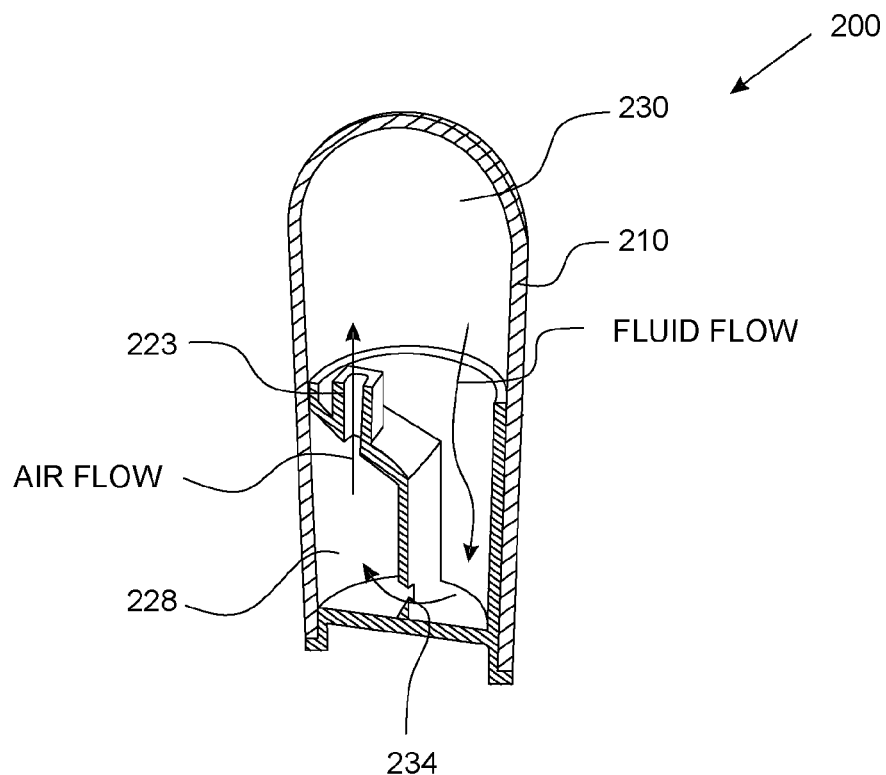

According to other embodiments of the invention, an example of which is illustrated in FIGS. 11-15, a timing device 200 may include an outer cylinder 210 having one closed end integral with the outer cylinder 210 and one open end. A flow regulator 220 as previously described may be inserted in the open end to seal the open end of the outer cylinder 210. FIGS. 10 and 11 illustrate the initial position of the timing device 200 and show the timing reservoir 228 and return channel filled with fluid. FIG. 12 illustrates the flow of air and fluid when the timing device 200 is inverted to begin the timing sequence, while FIG. 13 illustrates the return flow when the timing device is returned to its normal at rest position.

Figure 14:
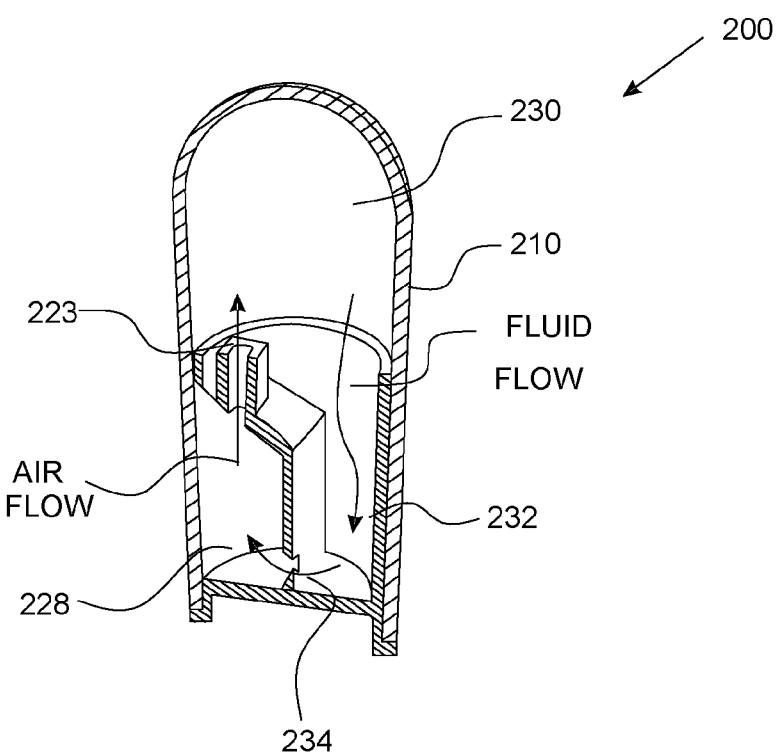
FIGS. 14-15 illustrate cross-sectional views thereof showing the flow path of fluid and air during a timing stage and reset stage when the timing device is used in a timing chamber filling configuration.
Figure 15:
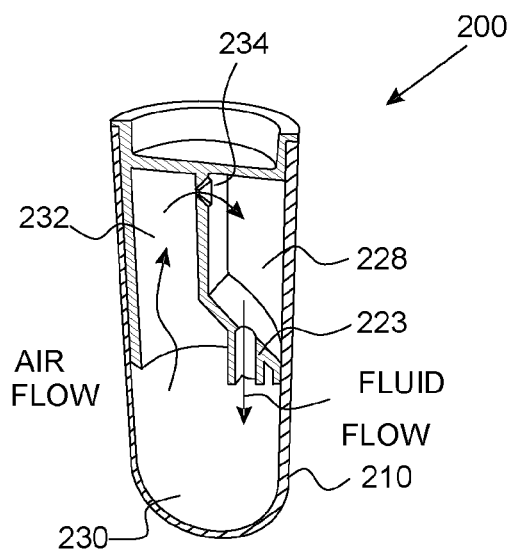

As illustrated in FIGS. 14 and 15, the timing device 200 may alternatively be inverted at a normal rest position such that the storage reservoir is initially filled and the timing reservoir 228 fills with fluid as the user dispenses a product from the dispensing device 100. The timing reservoir 228 will then be full when a dose has been dispensed. FIG. 15 illustrates the return path back to the storage reservoir when the timing device is returned to its normal at rest position.

Figure 16:
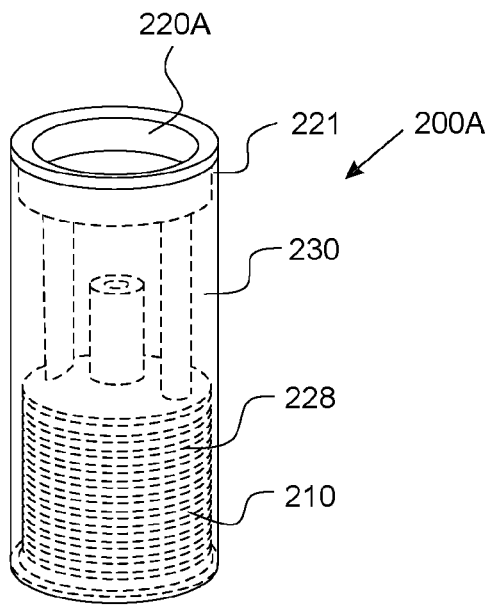
FIGS. 16-18 illustrate perspective and cross-sectional views of another timing device according to various embodiments of the invention.
Figure 17:
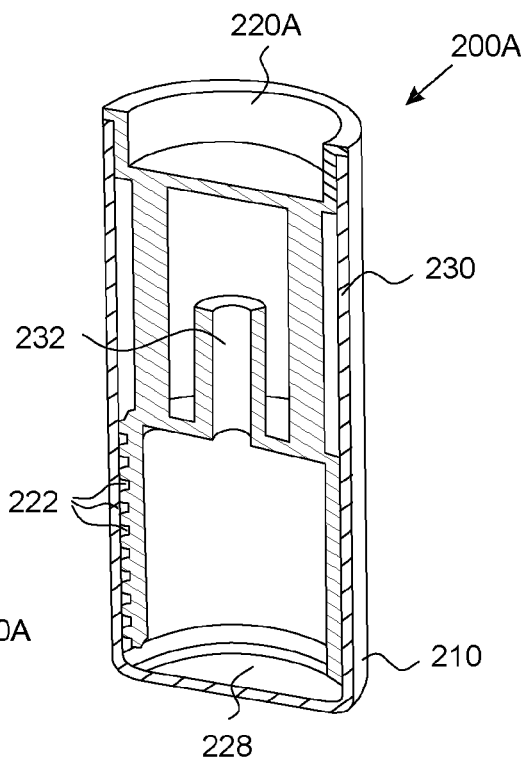
Figure 18:
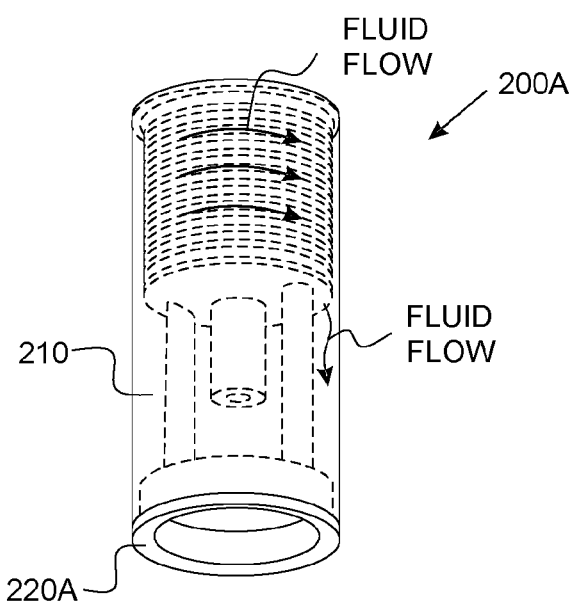
Figure 19:
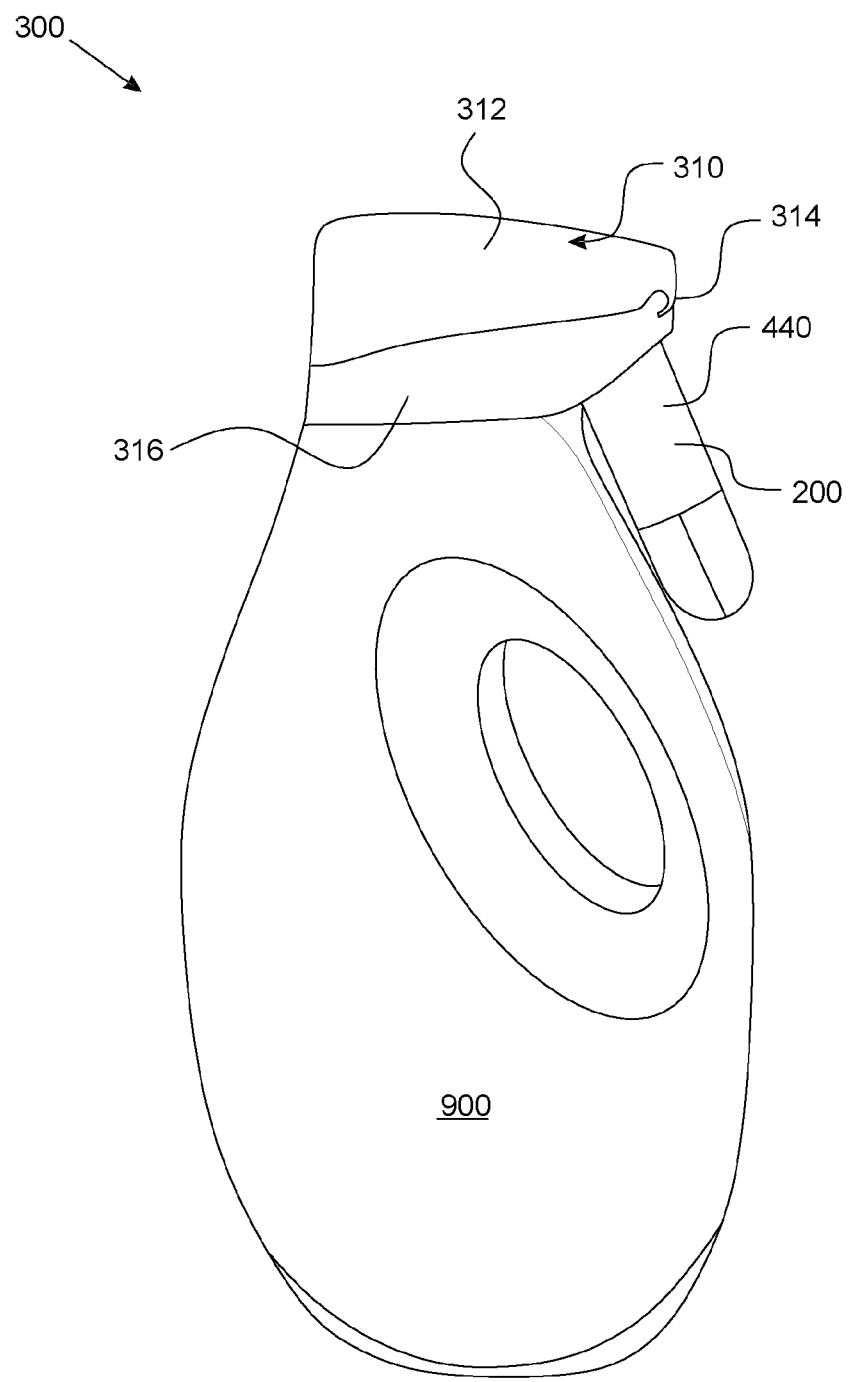
FIG. 19 illustrates a perspective view of another exemplary dispensing system according to various embodiments of the invention.
Figure 20:
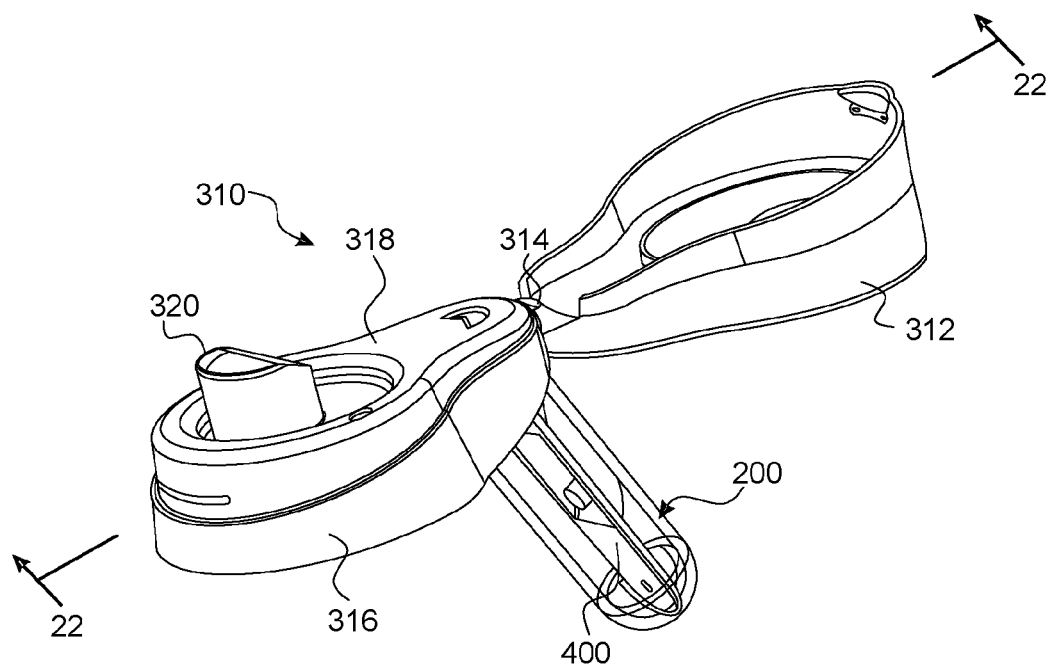
FIGS. 20-21 illustrate enlarged perspective views of the pour cap and timing device thereof.
Figure 21:
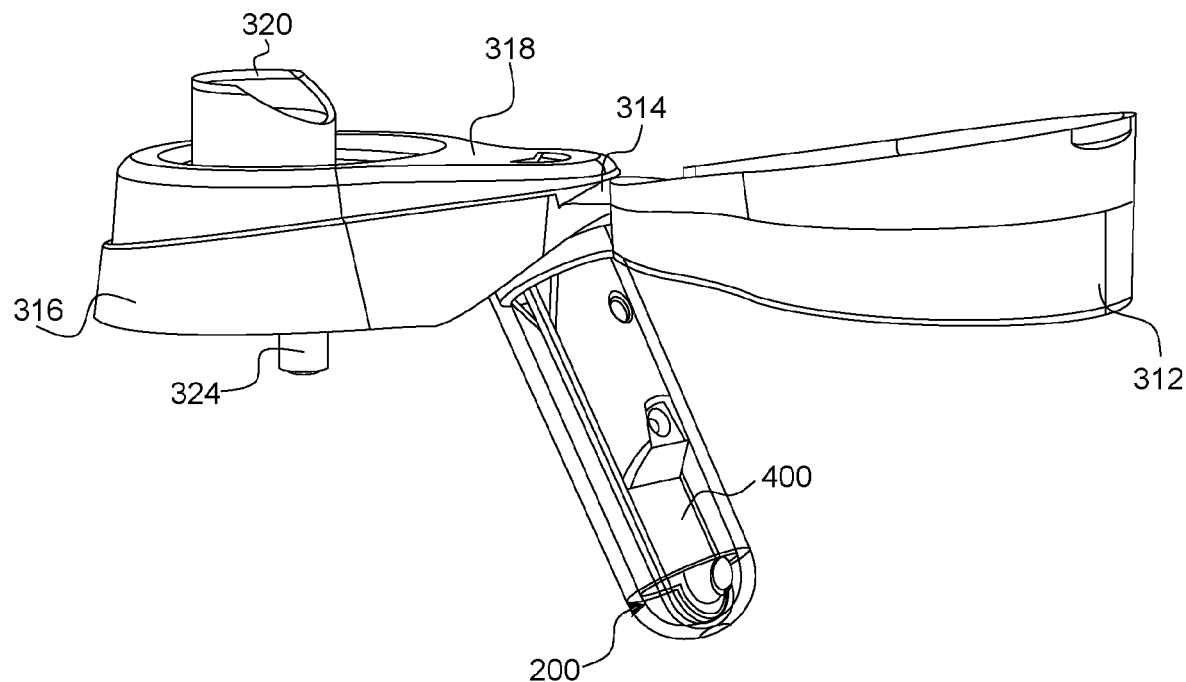
Figure 22:
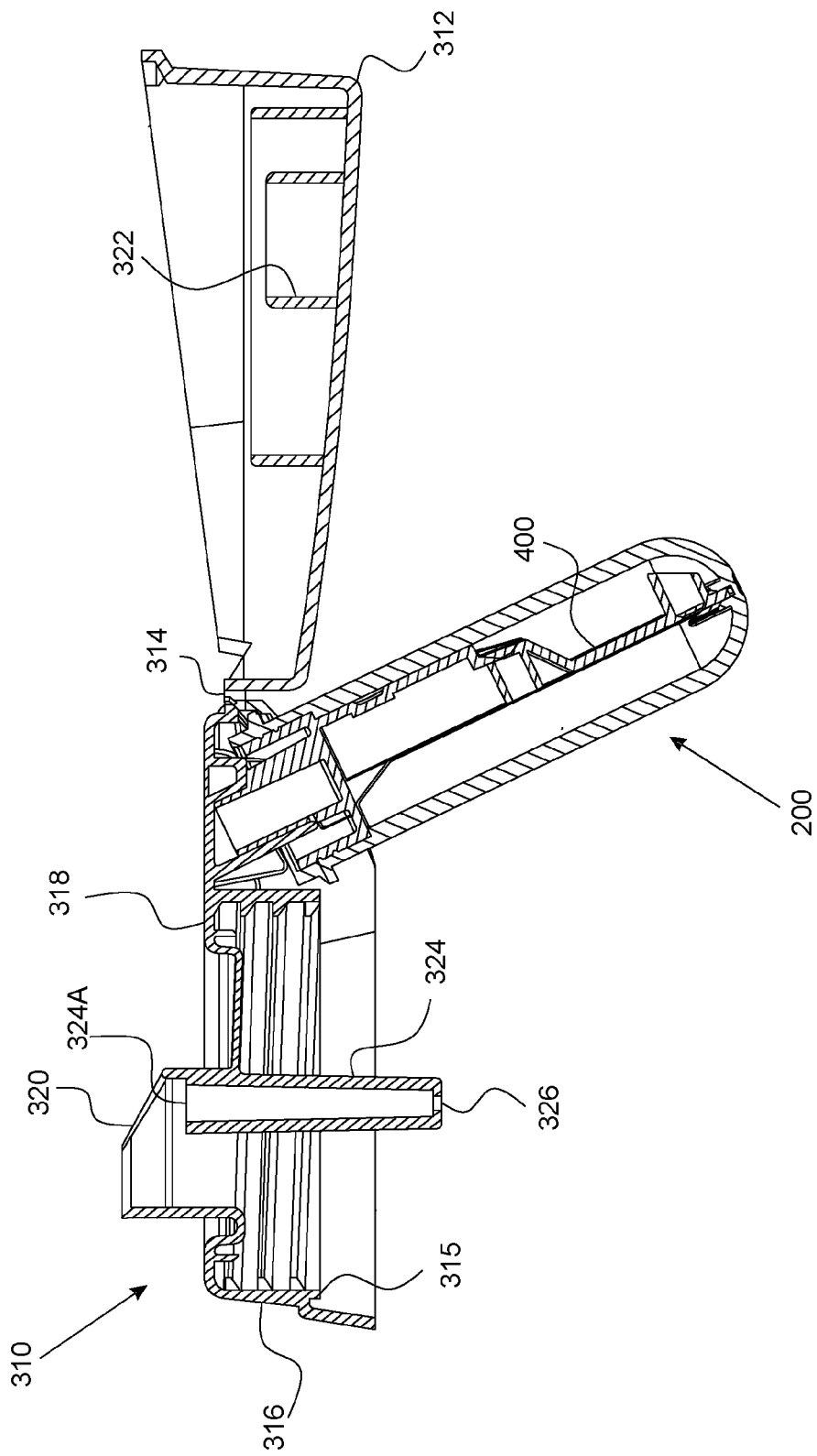
FIG. 22 illustrates a cross-section view of the pour cap and timing device taken along line 22-22 of FIG. 20.
Figure 23:
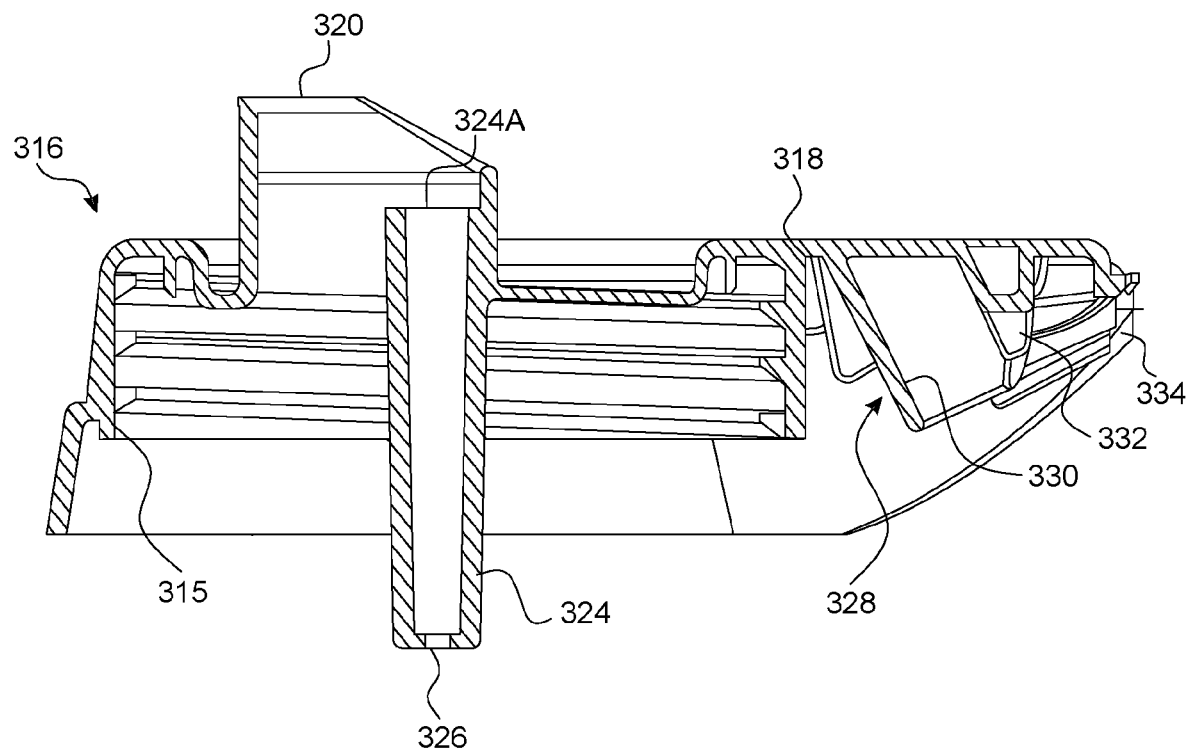
FIG. 23 illustrates an enlarged partial view thereof showing the venting configuration.

Referring now to FIGS. 16-18, another exemplary timing device 200A is illustrated. The timing device 200A includes a transparent or translucent outer cylinder 210 having an open end and a closed end. A flow regulator 220A may be inserted in an open end of the outer cylinder 210 to seal or close the end of the outer cylinder 210 into which it is placed. The flow regulator 220A within the outer cylinder 210 may define a timing reservoir 228 and a storage reservoir 230 separated by portions of the flow regulator 220A. Flow regulator 220A may include a spiral flow channel in fluid communication with the timing reservoir 228 and the storage reservoir. A fluid return channel 232 defined by the flow regulator 220 also connects the timing reservoir 228 and the storage reservoir for return flow.

Turning now to FIGS. 19-28, there is illustrated another exemplary dispensing system 300 according to various embodiments of the invention. A dispensing system 300 may include a container 900 and a pour cap 310. The pour cap 310 or container 900 may include a timing device 200 incorporated therein wherein the timing device is at least partially visible during use of the dispensing system 300.

According to various embodiments of the invention, a pour cap 310 may include a cap base 316 and a closure 312 as illustrated in FIGS. 19-23. The cap base 316 may be connected to or mated with a container 900. For instance, the cap base 316 may include an inner skirt 315 including threads, bayonet features, snap features, or other features allowing the pour cap 310 to be connected to an opening in a container 900 having similar features. The closure 312 may be connected to the cap base 316 by a living hinge 314 or other hinge system.

The cap base 316 includes a main deck 318 and a dispensing spout 320 extending upwardly therefrom. The closure 312 may include a complementary sealing wall 322 extending downwardly which may be received in engagement with the spout 320 to provide a seal. A venting tube 324 may be located within the dispensing spout 320. The venting tube 324 may be located adjacent the rear portion of the dispensing spout 320 opening and extends downwardly from the main deck 318 into the interior of the cap base 315. In other embodiments, the venting tube 324 may be located at other locations depending on the configuration of the cap base 316 and the size and orientation of the dispensing spout 320. A venting orifice 326 is located at the bottom terminal end of the venting tube 324. The venting orifice 326 may be provided by integrally molding the orifice or may be provided by a separate cap fitted over the terminal end of the venting tube 324. The upper end 324A of the venting tube 324 is preferably disposed below the undercut of the spout lip. The length of the venting tube 324 and the size of the venting orifice 326 may be adjusted to determine the venting performance of the dispensing system based on liquids with different viscosities.

As illustrated in FIGS. 19-23, a timing device 200 may be seated externally at a rear portion of the cape base 316 adjacent the hinge 314. In some embodiments of the invention, the cap base 316 may include a recess 328 into which a timing device 200 may be removably seated. The timing device 200 may be advantageously located on the pour cap 310 so that the timing device 200 is easily visible to a user during operation or use of the dispensing system 300.

Figure 24:
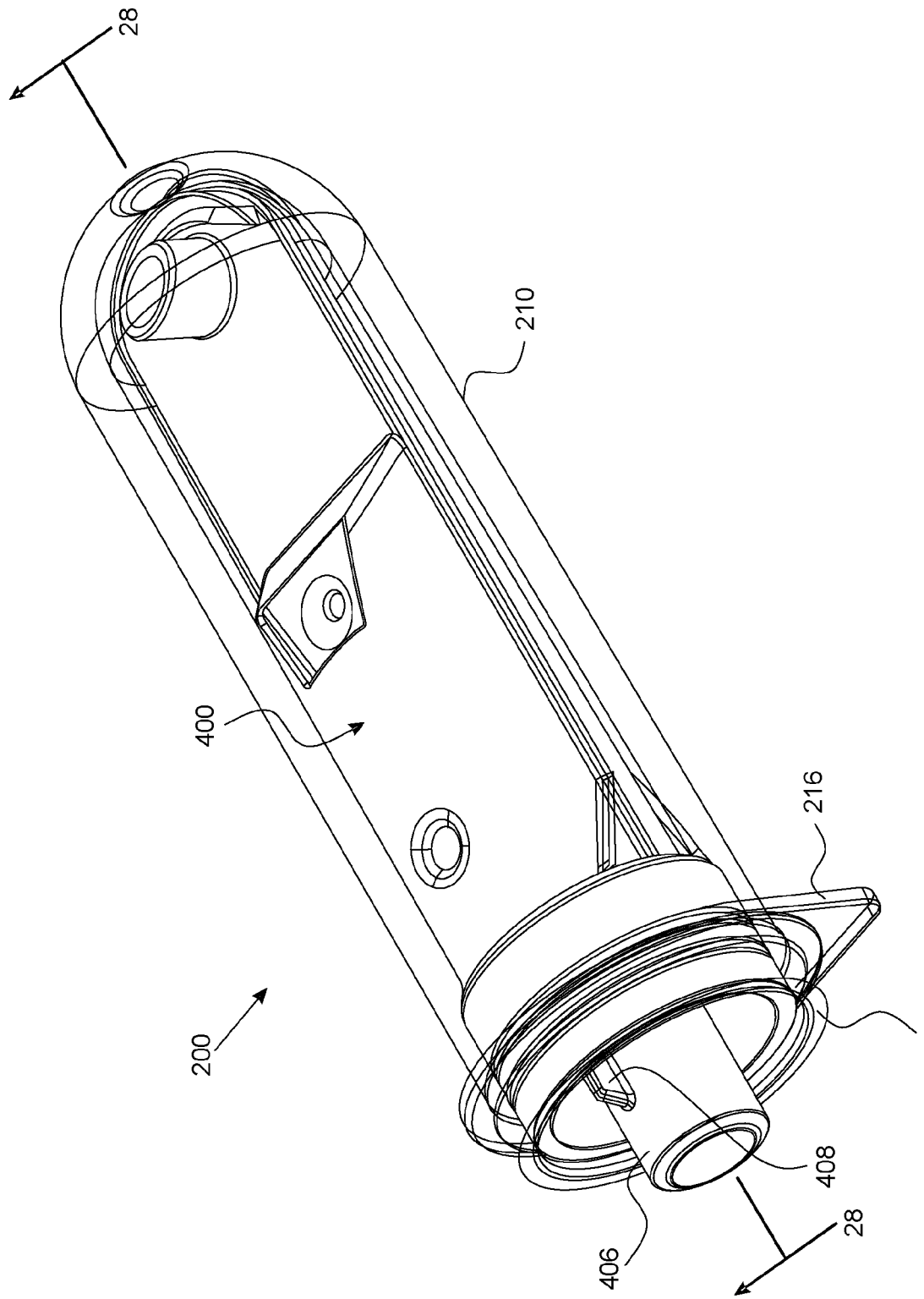
FIG. 24 illustrates a perspective view of an exemplary timing device of various embodiments of the invention.
Figure 25:
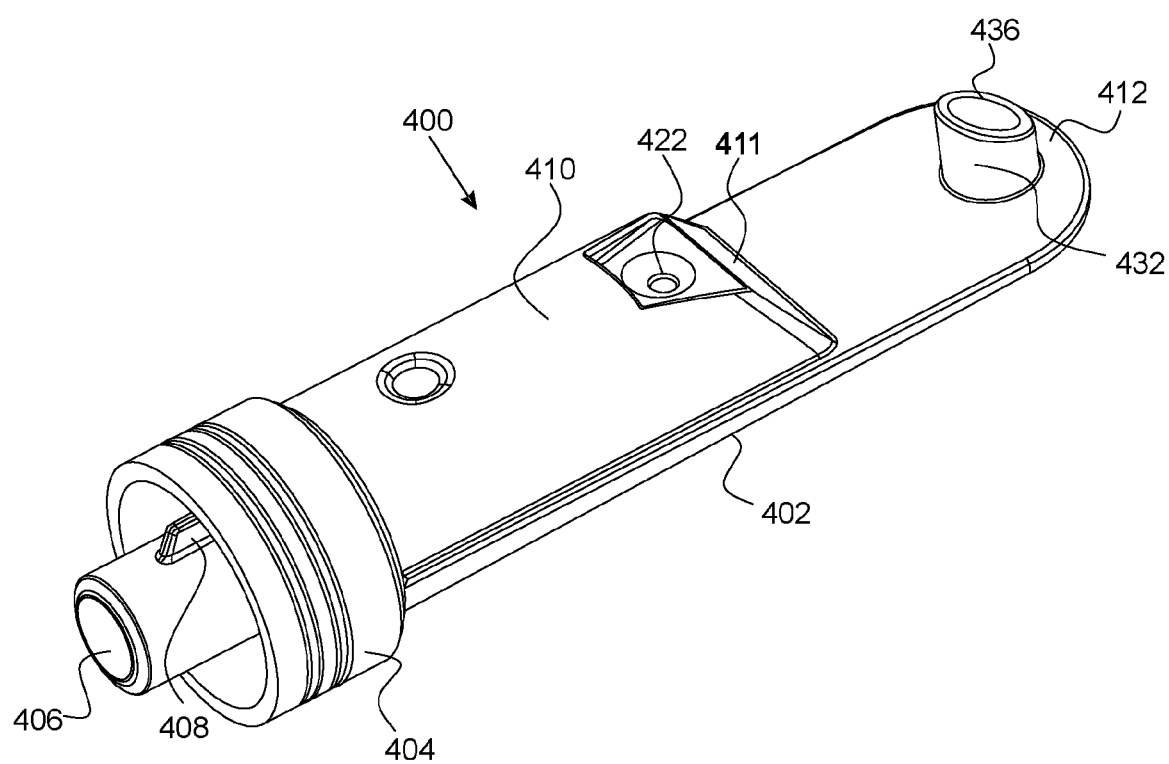
FIG. 25 illustrates a top perspective view of an exemplary flow regulator of various embodiments of the invention.
Figure 26:
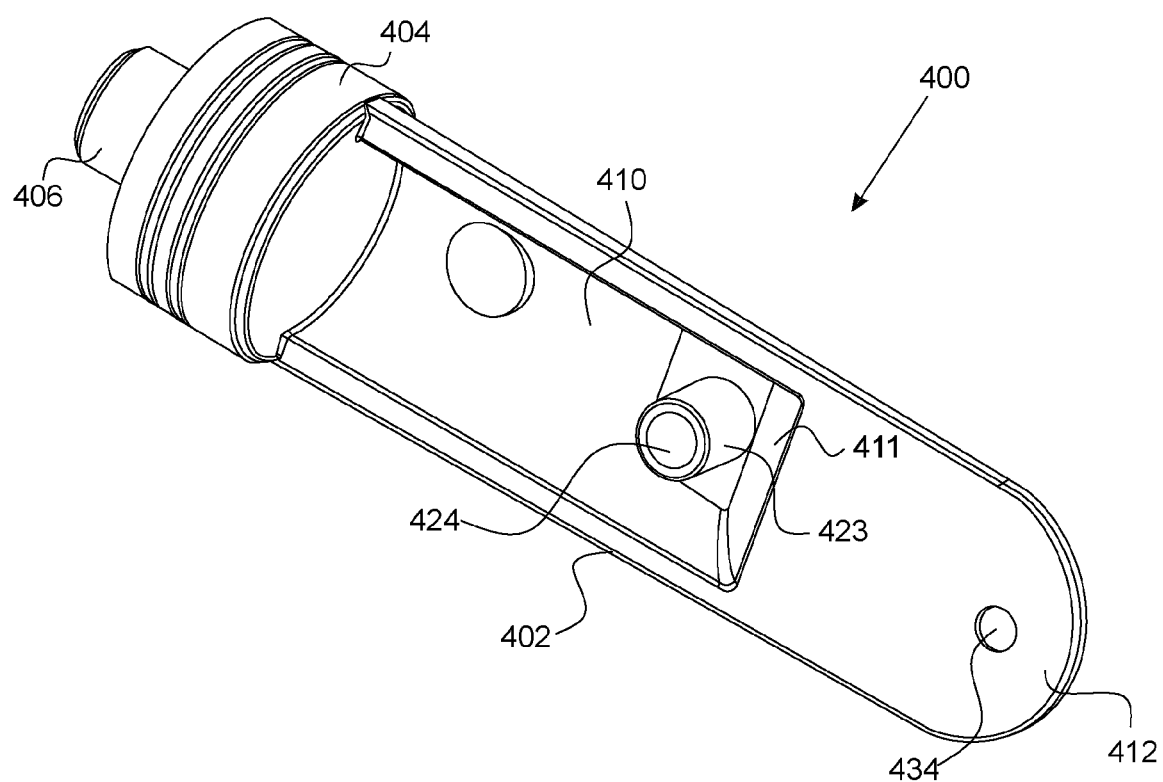
FIG. 26 illustrates a bottom perspective view thereof.
Figure 27:
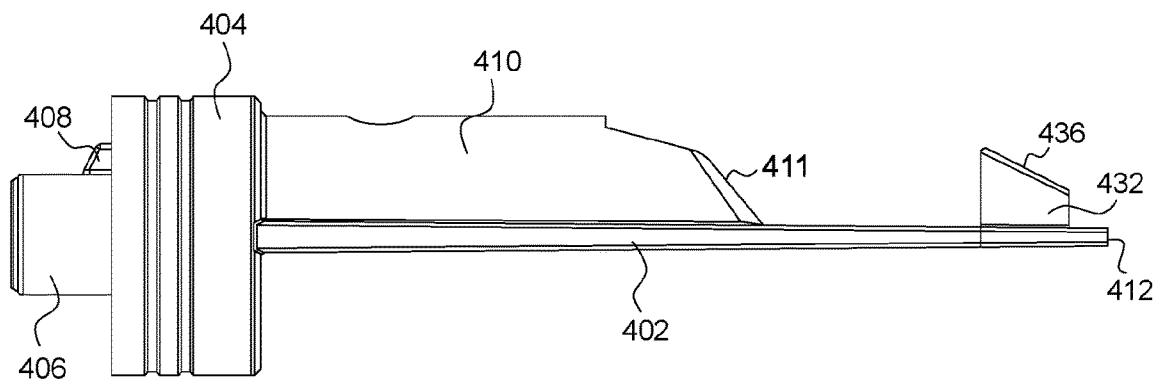
FIG. 27 illustrates a side view thereof.

An exemplary timing device 200 according to various embodiments is illustrated in FIGS. 24-28. As illustrated in FIG. 24, a timing device 200 may include a transparent or translucent outer cylinder 210 having an open end 221 and a hollow space defined by the outer cylinder 210, a flow regulator 400 received within the outer cylinder 210 and a flowable material 214, such as a colored fluid received within the outer cylinder 210. Flow regulator 400 includes a generally planar, elongate main body portion 402 and an end cap portion 404. Flow regulator 400 may be inserted in an open end 221 of the outer cylinder 210 where the end cap portion 404 may seal or close the end of the outer cylinder 210 into which it is placed. The outer surface of the end cap portion 404 and the inner surface of the outer cylinder 210 may include complementary sealing ribs to prevent leakage and maintain the end cap 404 assembled with the outer cylinder 210. The end cap portion 404 may include a central post 406 and an associated orientation fin 408 extending radially outward from the post 406. More particularly, the orientation fin 408 may be oriented perpendicular to the plane of the main body portion 402, the purpose of which will become more apparent hereinbelow. When assembled within the external recess 328 in the cap base 316, the post 406 fits within a corresponding annular wall 330 while the orientation fin 408 is received within a corresponding slot 332 in the wall 330. This arrangement maintains a proper rotational alignment of the timing device 200 relative to the pour cap 310. The outer cylinder 210 may include a flange 216 adjacent the open end 221 which is snap received under a corresponding shoulder 334 formed on the underside of the cap base 316 outer skirt to more securely maintain the timing device 200 assembled with the cap base 316.

Referring to FIGS. 25-28, the upper portion of the main body 402 of flow regulator 400 may include an upwardly extending curved wall 410 forming a cavity therebeneath. A terminal end portion 412 of the main body 402 is received into a slot 218 at the closed bottom end of the outer cylinder 210 to maintain positioning therein.

Figure 28:
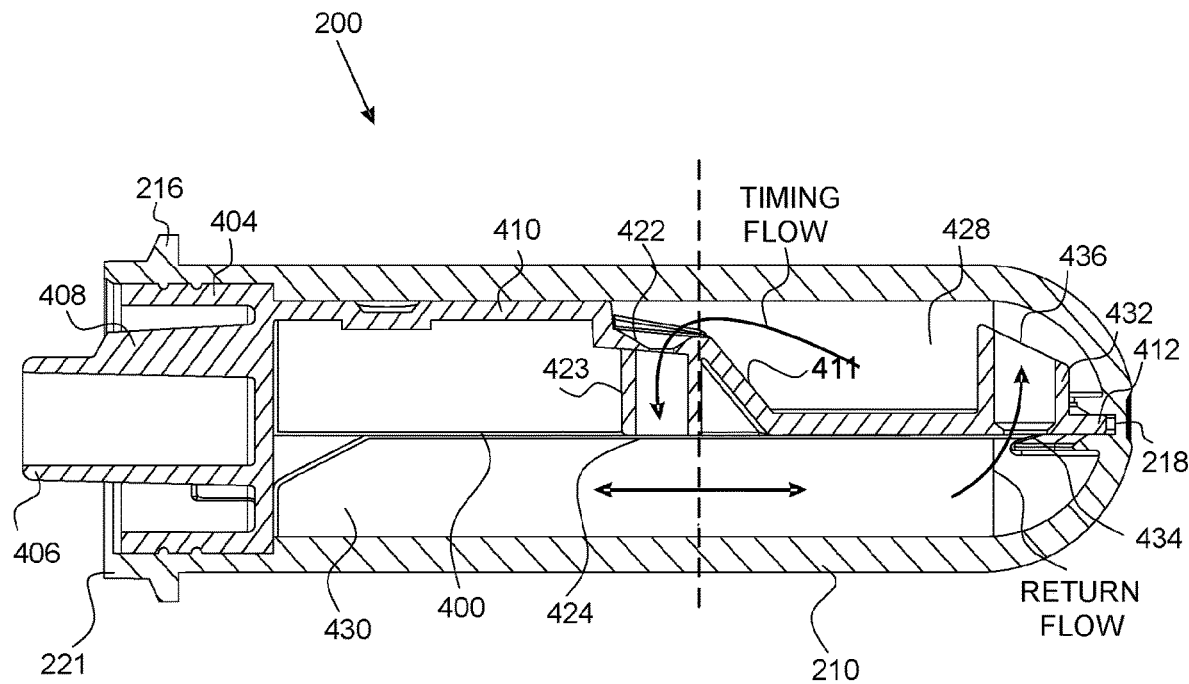
FIG. 28 illustrates a cross-sectional view of the timing device taken along line 28-28 of FIG. 24.

Positioning of flow regulator 400 within the outer cylinder 210 may define a timing reservoir 428 and a storage reservoir 430 separated by portions of the flow regulator 400 (see dashed line in FIG. 28). The terminal end portion 412 of the main body 402 divides the timing reservoir 428 in half with a portion of the fluid 214 above the main body 402 and a portion of the fluid 214 below the main body 402. Flow regulator 400 may include a flow channel 423 having a channel opening 422 in fluid communication with, and opening into, the storage reservoir 428. The flow opening 422 is preferably located on a lower portion of the curved wall 410 so as to prevent flow, i.e. the start of timing, until the bottle 900 is tilted sufficiently to allow for the product to begin flowing from the dispensing spout 320. In this regard the, resting angle of the timing device 200, and positioning of the channel opening 422 cooperate to coordinate simultaneous flow of the product from the spout 320 with flow of the fluid 214 in the timing device 200. As best seen in FIG. 28, the timing fluid 214 must ride up an angled wall portion 411 before being able to enter into the flow channel opening 422. A channel exit 424 may be positioned opposite the channel opening 422 and in fluid communication with, and opening into, the storage reservoir 430. Channel 423 may be defined between the channel opening 422 and channel exit 424. A dispensing/timing cycle occurs in a similar sequence to that shown in FIGS. 6-9. It is noted here that the timing device 400 may further comprise an opaque sleeve 440 surrounding the storage reservoir 430 (see FIG. 19). The opaque sleeve 440 shrouds the storage reservoir 430 to provide a more aesthetically pleasing presentation of the timing sequence. The sleeve 440 replaces the shrouding function provided in the earlier described embodiments where the timing device 200 is located beneath the cap base outer skirt 118 and is only visible through a window 122 in the outer skirt.

A fluid return channel 432 is defined by the flow regulator 20 adjacent the terminal end of the main body 402. The return channel 432 has a fluid entrance 434 on the lower surface of the main body 402 and an exit 436 at the upper end of the channel 432. The exit 436 is preferably located immediately adjacent to the inner wall of the outer cylinder 210 in order to reduce the formation of bubbles during return flow. The narrow space between the channel exit 436 and the interior wall creates a more stable laminar flow which is less prone to bubble formation.

Figure 29:
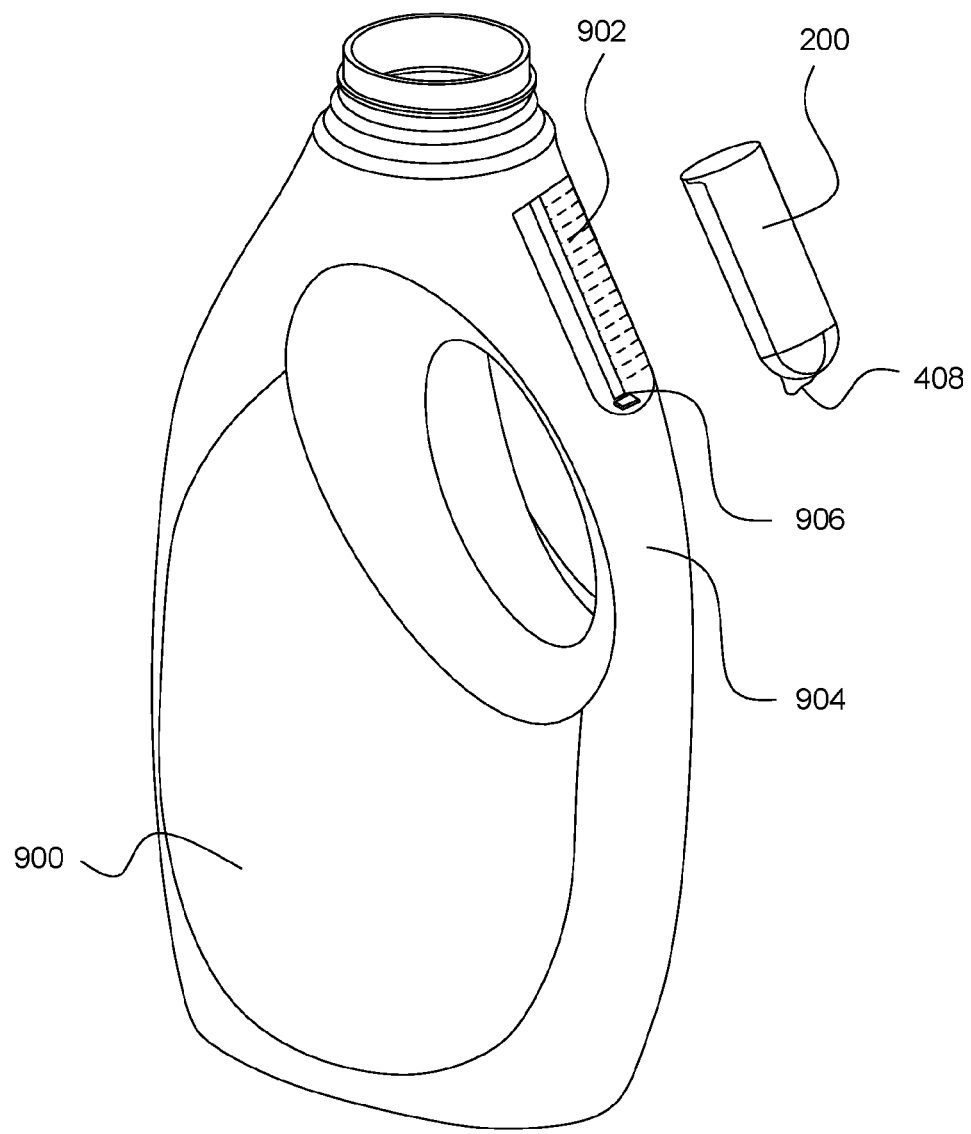
FIGS. 29-30 illustrate another exemplary dispensing system according to various embodiments of the present invention showing the timing device integrated into the bottle.
Figure 30:
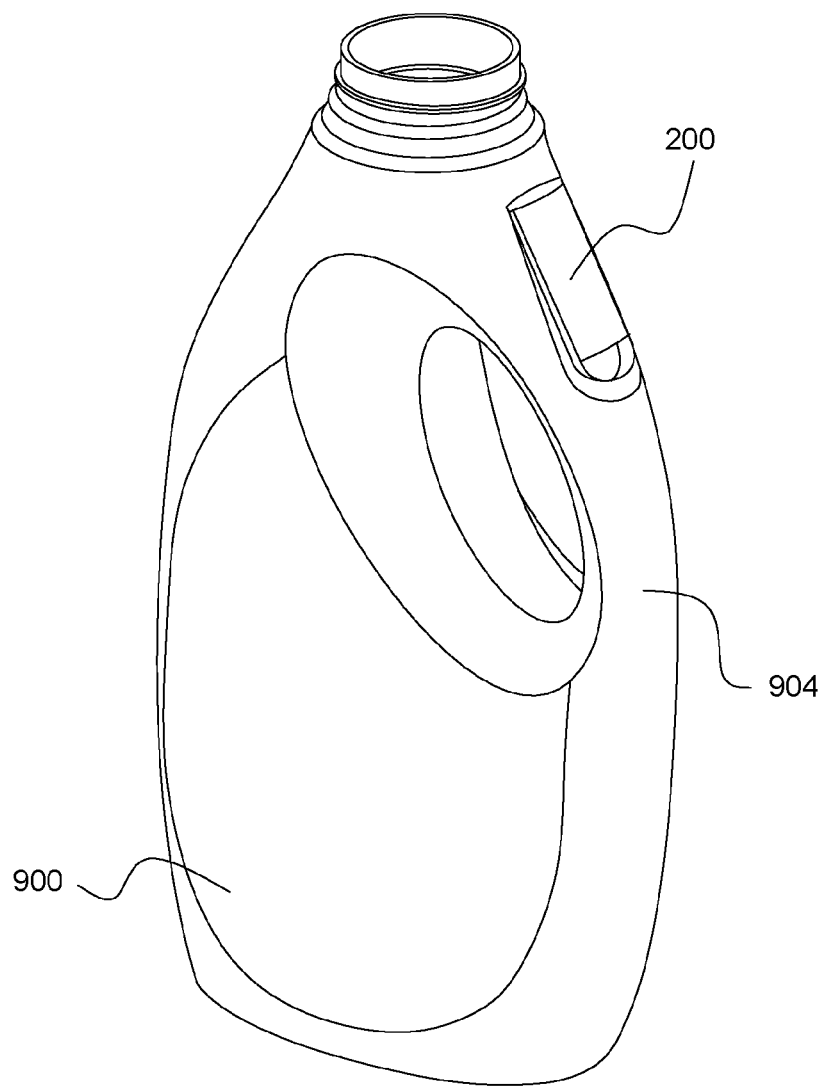

In other embodiments of the invention, a timing device 200 may be removably received within a recess 902 formed directly within the blow molded bottle 900, or more specifically, within the handle 904 as illustrated in FIGS. 29-30. An orientation fin 408 is formed on the outer surface of the outer cylinder 210 for mating with a corresponding slot 906 in the recess 902.

Figure 31:
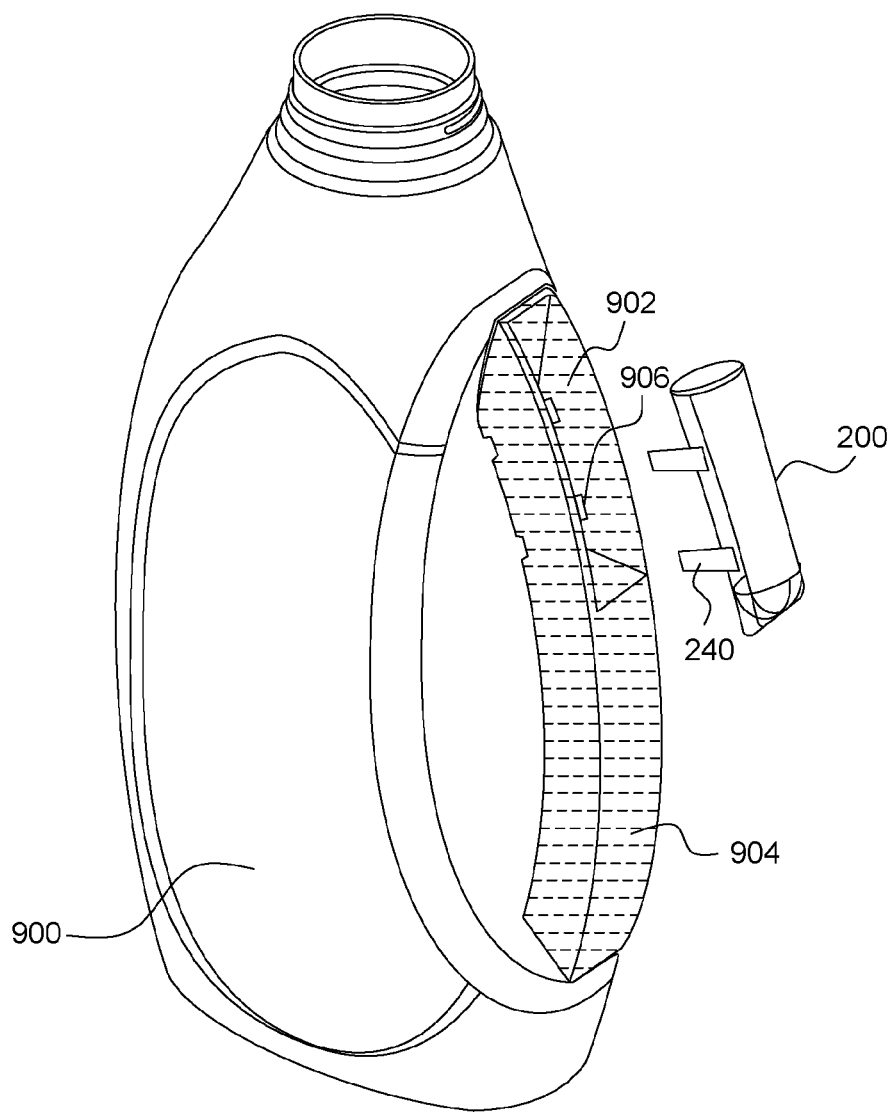
FIGS. 31-32 illustrate still another exemplary dispensing system according to various embodiments of the invention showing the timing device integrated into a separate handle.
Figure 32:
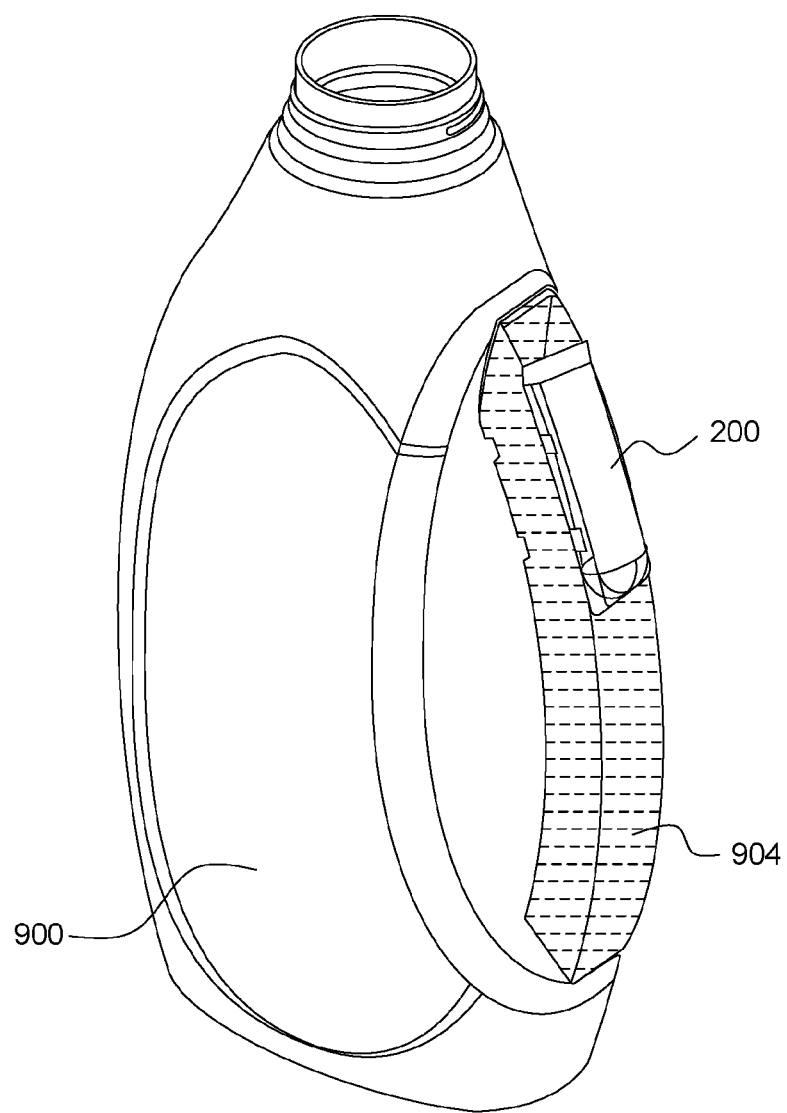

In still other embodiments, a timing device 200 may be removable received within a recess 902 in a separately molded handle 904 as illustrated in FIGS. 31-32. The outer cylinder 210 of the timing device 200 may include securing elements 240, for example latch tabs, which are received into corresponding slots 906 formed in the handle 904.

Figure 33:
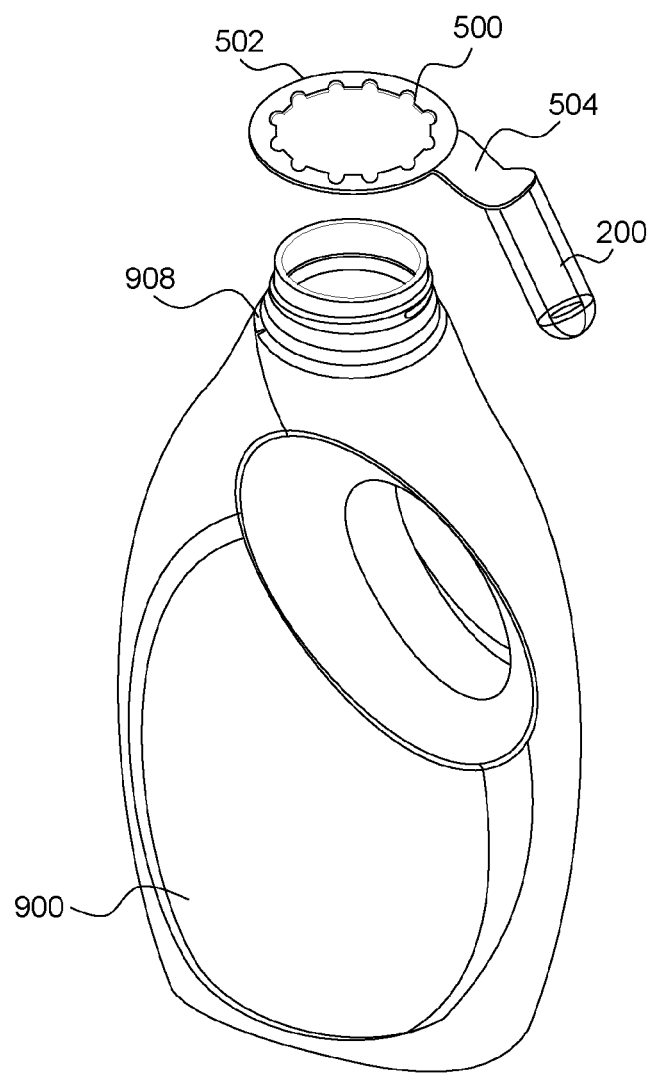
FIGS. 33-34 illustrate yet another exemplary dispensing system according to various embodiments of the invention showing the timing device attached to the bottle.
Figure 34:
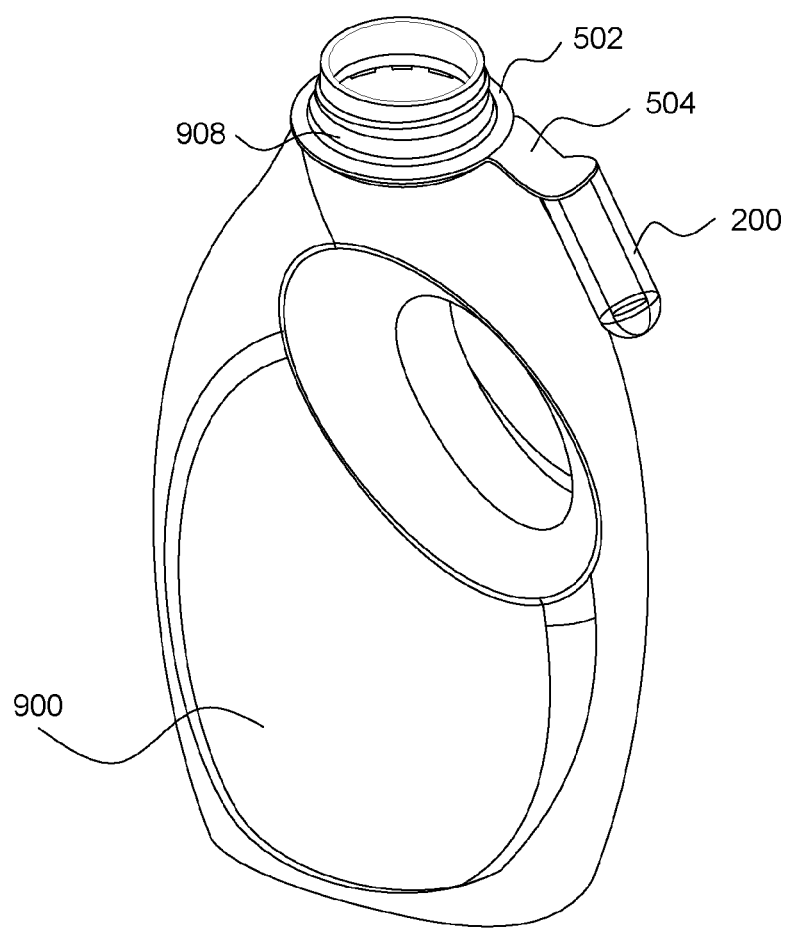

Still further yet, as illustrated in FIGS. 33-34, other embodiments of the invention may include a separate securing element 500, such as a hanger ring, for securing the timing device 200 to the bottle 900. The hanger ring 500 may include an annular ring portion 502 which may be received around the neck 908 of the bottle 900 and may further include a depending attachment tab 504 to which the upper end of the timing device 200 may be removable secured.

While various embodiments of the invention have been described with respect to a fluid contained in the timing device 200, it is understood that other embodiments may utilize another flowable material such as powder or granules. In various embodiments, a fluid or flowable material may be colored to offer a contrast to make it easier for a user to visualize the flow in the timing device 200.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A dispensing system comprising:
a container;
a pour cap attached to the container for dispensing a pourable product from the container; and
a timing device secured to the container or the pour cap, wherein the timing device comprises:
   a transparent or translucent outer cylinder;
   a flowable material sealed within the cylinder; and
   a flow regulator positioned within the outer cylinder, the flow regulator comprising a planar body portion defining a storage reservoir and a timing reservoir within the outer cylinder, said planar body portion including a timing opening and a return opening allowing said flowable material to move between the storage reservoir and the timing reservoir.

2. The dispensing system of claim 1,
wherein the flowable material comprises a fluid.

3. The dispensing system of claim 2 wherein the fluid comprises a colored fluid.

4. The dispensing system of claim 2 wherein the pour cap includes a cap base and a closure connected to the cap base by a hinge, and wherein the timing device is secured to the cap base.

5. The dispensing system of claim 4 wherein the hinge is at a rear portion of the pour cap and the timing device is adjacent the hinge.

6. The dispensing system of claim 5 wherein the cap base includes an outer skirt having a window adjacent the hinge, and the timing device is visible through the window.

7. The dispensing system of claim 2 wherein the timing device is secured to the container adjacent the pour cap.

8. The dispensing system of claim 2, wherein the container includes a handle, and the timing device is secured to the handle of the container.

9. The dispensing system of claim 8 wherein the handle is integrally formed with the container.

10. The dispensing system of claim 1 wherein said pour cap includes a dispensing spout and a venting tube within the dispensing spout.

11. The dispensing system of claim 10 wherein an upper edge of the venting tube is disposed beneath an upper edge of the dispensing spout.

12. A dispensing system comprising:
a container;
a pour cap attached to the container; and
a timing device associated with the container or the pour cap,
wherein the timing device comprises:
   a transparent or translucent outer cylinder, said outer cylinder including an interior wall;
   a timing fluid contained within the cylinder; and
   a flow regulator within the outer cylinder, the flow regulator and interior wall define a timing reservoir and a storage reservoir the flow regulator including a timing opening and a fluid return opening,
wherein the pour cap includes a cap base and a closure connected to the cap base by a hinge, and wherein the timing device is secured to the cap base,
wherein the hinge is at a rear portion of the pour cap and the timing device is adjacent the hinge, and
wherein the cap base includes an outer skirt and the timing device protrudes below an outer periphery of the outer skirt.

13. The dispensing system of claim 12 wherein the timing device includes an opaque sleeve received around a portion of the outer cylinder.

14. A timing device for metering a pourable product dispensed from a dispensing system including a container and a pour cap, said timing device comprising:
- a transparent or translucent outer cylinder;
- a flowable material sealed within the cylinder; and
- a flow regulator positioned within the outer cylinder, the flow regulator comprising a planar body portion defining a storage reservoir and a timing reservoir within the outer cylinder, said planar body body including a timing opening and a return opening allowing said flowable material to move between the storage reservoir and the timing reservoir.

15. The timing device of claim 14 wherein the flowable material comprises a fluid.

16. The timing device of claim 15 wherein the fluid comprises a colored fluid.

17. The timing device of claim 16 further comprising an opaque sleeve received around a portion around the outer cylinder.

18. The timing device of claim 17 wherein the opaque sleeve is received around the outer cylinder to shroud either the timing reservoir or the storage reservoir.

19. The timing device of claim 14 further comprising a securing element configured to selectively secure said timing device to said pour cap or said container.

\* \* \* \* \*